(12) United States Patent
Keim et al.

(10) Patent No.: US 7,737,998 B1
(45) Date of Patent: *Jun. 15, 2010

(54) SYSTEM AND METHOD FOR CONTIGUOUS IMAGES FROM POLYGONS

(75) Inventors: Daniel Keim, Steisslingen (DE); Stephen Charles North, Lebanon, NJ (US); Christian Panse, Constance (DE)

(73) Assignee: AT&T Intellectual Property II, L.P., New York, NY (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/857,097

(22) Filed: Sep. 18, 2007

Related U.S. Application Data

(63) Continuation of application No. 10/963,868, filed on Oct. 13, 2004, now Pat. No. 7,286,144, which is a continuation of application No. 10/371,714, filed on Feb. 21, 2003, now Pat. No. 6,853,386.

(60) Provisional application No. 60/359,967, filed on Feb. 27, 2002.

(51) Int. Cl.
*G09G 5/00* (2006.01)
*G06T 11/20* (2006.01)

(52) U.S. Cl. .................................. 345/647; 345/441
(58) Field of Classification Search ......... 345/440–442, 345/619, 647
See application file for complete search history.

(56) References Cited

U.S. PATENT DOCUMENTS

| 5,473,742 A | 12/1995 | Polyakov et al. |
| 5,506,947 A | 4/1996 | Taubin |
| 5,694,534 A | 12/1997 | White et al. |
| 5,802,492 A | 9/1998 | DeLorme et al. |
| 6,697,080 B2 | 2/2004 | Trika et al. |
| 6,853,386 B1 | 2/2005 | Keim et al. |

OTHER PUBLICATIONS

Changming Du, Lin Liu. "Constructing Contiguous Area Cartogram Using Arcview Avenue". The association of Chinese Professionals In GIS, 1999.
Keim, D.A., et al. "CartoDraw: A Fast Algorithm for Generating Contiguous Cartograms". IEEE Transactions on Visualization and Computer Graphics, vol. 10, No. 1, Jan./Feb. 2004.
Continuous cartogram construction House, D.H.; Kocmoud, C.J.; Visualization '98. Proceedings Oct. 18-23, 1998 pp. 197-204, 533 Digital Object Identifier 10.1109/VISUAL.1998.745303.

*Primary Examiner*—Ryan R Yang

(57) ABSTRACT

A system, method and computer-readable media are disclosed for generating an image from another image of contiguous polygons and a vector containing values to which areas of corresponding polygons are scaled. The method embodiment relates to generating an image from a plurality of contiguous polygons having vertices. The method comprises calculating a shape value associated with a polygon, calculating an altered shape value associated with an altered polygon, the altered polygon being an altered version of the polygon, calculating a shape distortion by comparing the shape value and the altered shape value and determining whether to accept the altered polygon based on the calculated shape distortion.

12 Claims, 21 Drawing Sheets

FIG. 3

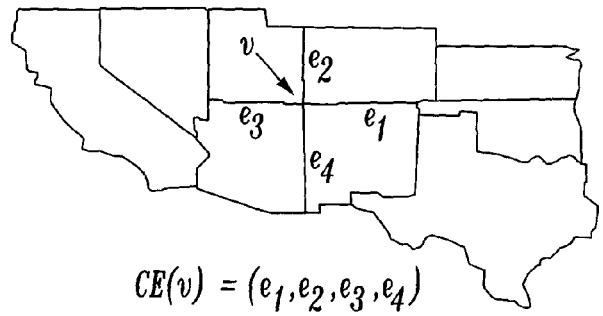

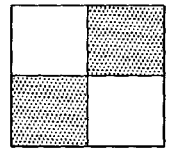 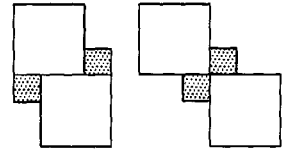 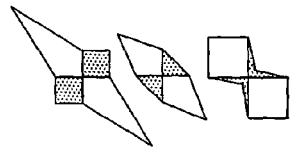

FIG. 4D  FIG. 4E  FIG. 4F  FIG. 4G

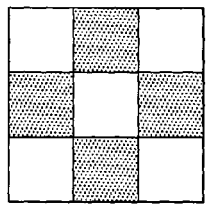 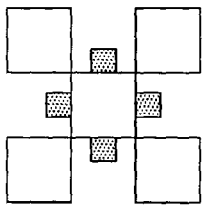 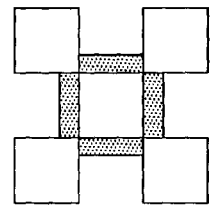 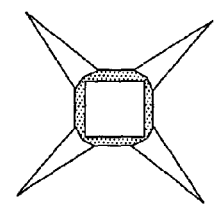

FIG. 5

| Constraints | single-polygon 51 | all-polygon 52 | minimum 53 |
|---|---|---|---|
| Area | $\forall j : d_A(A(\overline{p_j}), \tilde{x}_j) \leq \varepsilon$ | $\Sigma d_A(A(\overline{p_j}), x_j) \leq \varepsilon$ | $\Sigma d_A(A(\overline{p_j}), x_j) \stackrel{!}{\to} min$ |
| Shape | $\forall j : d_S(S(\overline{p_j}), S(p_j)) \leq \varepsilon$ | $\Sigma d_S(S(\overline{p_j}), S(p_j)) \leq \varepsilon$ | $\Sigma d_S(S(\overline{p_j}), S(p_j)) \stackrel{!}{\to} min$ |

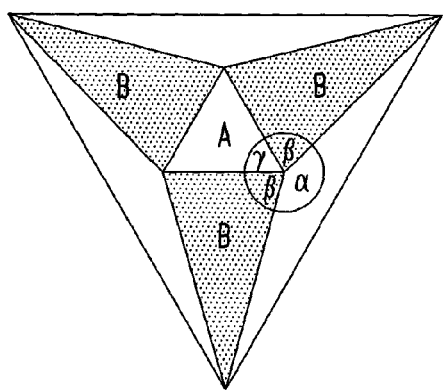
FIG. 6A
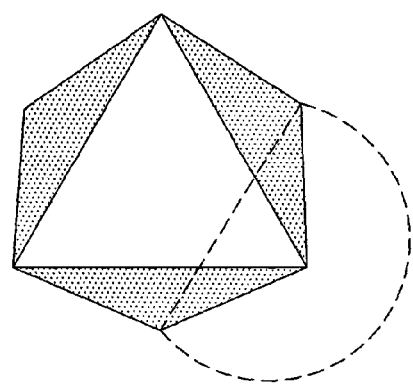
FIG. 6B
FIG. 7
| single-polygon | all-polygon | minimum |
|---|---|---|
| $\forall r: d_S(S(G_r(\overline{\mathcal{P}})), S(G_r(\mathcal{P}))) \leq \varepsilon$ | $\Sigma d_S(S(G_r(\overline{\mathcal{P}})), S(G_r(\mathcal{P}))) \leq \varepsilon$ | $\Sigma d_S(S(G_r(\overline{\mathcal{P}})), S(G_r(\mathcal{P}))) \stackrel{!}{\rightarrow} min$ |
FIG. 8
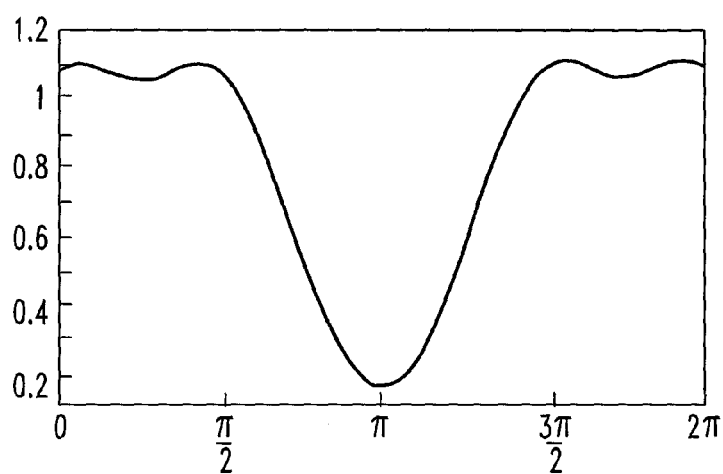

FIG. 9

ReduceGlobalVertices $(\mathcal{P}, \mathcal{G}P, MaxAreaDif\ f)\{$ $V=\{v \in gp_j | v \notin gp_m \text{ for } m \neq j\}$ //Only consider vertices if they are not part of multiple polygons do $\{$ $\bar{v}=\{v \in V | \underset{v \in V}{MIN} I(v)\}$         //Determine the least important vertex $j=\{j \in \{1...k\} | \bar{v} \in p_j\}$         //Determine the polygon containing the least important vertex if $(\|A_S(p_j \setminus \{\bar{v}\}) - A_S(p_j)\| \leq MaxAreaDif\ f)$ $$p_j = p_j \setminus \{\bar{v}\};$$

$V = V \setminus \{v\}$ $\}$ While $V \neq \{\}\}$ $\}$

FIG. 10

ReduceInnerVertices($P, GP, MinAreaImpr$) {

$IV = \bigcup_{j=1...k} \{v | v \in p_j\} \setminus \bigcup_{j=1...k} \{v | v \in gp_j\}$ //all interior vertices $CV = \{v \in IV : |edges(v)| > 2\}$ //connecting interior vertices forall $p_j \in P$ $p_j = \{c \in p_j | c \notin (IV \setminus CV)\}$; //remove all non-connecting vertices forall $p_j \in P$ { //reintroduce important non-connecting vertices //Assume that the adjacent inner vertices $\{v_1,...,v_m\} \in (IV \setminus CV)$ have bee removed between
//vertex $v_s$ and $v_e$ of polygon $p_j$ in step 1.

forall $((v_s, v_e)$ removed in step 1) {

$\bar{n} = \underset{n \in 1...m}{MIN} \left( \underset{(v_{i_1},...,v_{i_{\bar{n}}}) \in \{v_1,...,v_m\}, v_i \neq v_{i_k}}{MAX} \|A_S(p_j \cup \{v_{i_1},...,v_{i_j}\}) - A_S(p_j)\| \right)$ $Ptmp = p_j \cup \{v_{i_1},...,v_{i_{\bar{n}}}: (v_{i_1},...,v_{i_{\bar{n}}}) \in \{v_1,...,v_m\}, v_i \neq v_{i_k}\} \underset{}{MAX} \|A_S(p_j \cup \{v_{i_1},...,v_{i_j}\}) - A_S(p_j)\|$;

if ($\|A_S(Ptmp) - A_S(p_j)\| \geq MinAreaImpr$)  $p_j = Ptmp$;

Scanline($P, \tilde{X}, sl$) { foreach $sp \in \{sp_i | sp_i = s + \frac{i}{n}(t-s), i = (0...n)\}$ {   // set of scanline section points which lie on $sl$ $l_i = sp \perp \vec{sl}$   // section line $V_i = \{v \in V | \|l_i - v\| \leq \xi\}$   //vertices in scanline $i$, i.e. clocer then $\xi$ to $l_i$ $SP_i = \{j \in \mathbb{N} | \exists v : v \in V_i \wedge v \in p_i\}$   // number of polygons which contain at least one vertex from $V_i$ $SF_i = const \cdot \sum_{r \in S_i} \left( \frac{\tilde{x}_r - A(p_r)}{\tilde{x}_r + A(p_r)} \cdot \frac{\tilde{x}_r}{\sum_{r \in S_i}^{n} \tilde{x}_i} \right)$   // scaling factore foreach $v \in V_i$ { if ( *direction* = *scanline* )

$o(v) = \frac{\overrightarrow{v \perp l_i}}{|\overrightarrow{v \perp l_i}|} \cdot \frac{sl}{|sl|}$   else   $o(v) = \frac{\overrightarrow{v \perp sl}}{|\overrightarrow{v \perp sl}|} \cdot \frac{l_i}{|l_i|}$ ;   // direction = section line $l_i$ $v = v + SF_i \cdot o(v)$

FIG. 16

```
CartoDraw (P, X̃, SL) {
    do {
        AreaError = AreaDist (P, X̃);
160 ─── foreach (sl ∈ SL) {
161 ─── P̄ = scanline(P, X̃, sl);
162 ─── if (ShapeDist(P, P̄) < ε_S && |AreaError − AreaDist (P, X̃)| < ε_A
            P = P̄
        }
165 ─{ } while  (0 ≤ AreaError − AreaDist (P, X̃) ≤ ε);
    }
}
```

SYSTEM AND METHOD FOR CONTIGUOUS IMAGES FROM POLYGONS

PRIORITY CLAIM

The present application is a continuation of U.S. patent application Ser. No. 10/963,868, filed Oct. 13, 2004, which is a continuation of U.S. patent application Ser. No. 10/371,714, filed Feb. 21, 2003, which claims priority from U.S. Provisional Application No. 60/359,967, filed Feb. 27, 2002, the contents of which are incorporated herein by reference in their entirety.

FIELD OF THE INVENTION

The present invention relates generally to visualization of geographically related information, and more particularly, to a system and method of automatically or semi-automatically generating a cartogram based on an input set of contiguous polygons and an input data vector.

BACKGROUND OF THE INVENTION

Cartograms are a well-known technique for showing geography-related statistical information, such as population demographics, election results and epidemiological data. The basic idea is to distort a map by resizing its regions according to some geographically related statistical parameter, but in a way that keeps the map recognizable. Cartographers and geographers have used cartograms since long before computers were available to make displays. Because cartograms are difficult to make by hand, the study of programs to draw them is of interest.

Other visualization techniques include the conventional choropleth map. A choropleth map is a map divided into regions that are shaded according to the value of a variable for that region. High values are often concentrated in highly populated areas, and low values may be spread out across sparsely populated areas. Such maps therefore tend to highlight patterns in less dense areas where few people live. In contrast, cartograms display areas in relation to an additional parameter, such as population. Patterns may then be displayed in proportion to that parameter (e.g. the number of people involved) instead of the raw size of the area involved. A population-based cartogram is presented in FIG. 1B. The cartogram gives a much different impression of overall trends, as compared with the original map (FIG. 1A).

For a cartogram to be recognizable it is important to preserve the global shape or outline of the input map, a requirement that has been overlooked in the past. To address this, the inventors' objective function for cartogram drawing includes both global and local shape preservation. To measure the degree of shape preservation, a shape similarity function is proposed. The function is based on a Fourier transformation of the polygons' curvatures. Also, because the application goal is visualization of dynamic network behavior, an algorithm is needed that recalculates a cartogram in a few seconds. No previous algorithm known to the inventors provides adequate performance with an acceptable level of quality for that application.

In the present application, the inventors formally define a family of cartogram drawing problems, and show that even simple variants are unsolvable in the general case. The feasible variants are NP-complete; i.e., the problem is both NP (verifiable in nondeterministic polynomial time) and NP hard (any other NP problem can be translated into this problem). Heuristics are therefore needed to solve the problem. Previously proposed solutions suffer from problems with the quality of the generated drawings.

The present application describes an efficient iterative scanline algorithm to reposition edges while preserving local and global shapes. Scanlines may be generated automatically, or entered interactively to guide the optimization process more closely. The algorithm is applied to a number of example data sets, providing a detailed comparison of the two variants of our algorithm and previous approaches. A cartogram can be seen as a generalization of an ordinary map. In that interpretation, an arbitrary parameter vector gives the intended sizes of the cartogram's regions, so an ordinary map is simply a cartogram with sizes proportional to land area. In addition to the classical applications mentioned above, a key motivation for cartograms as a general information visualization technique is to have a method for trading off shape and area adjustments.

For a cartogram to be effective, a human must be able to quickly understand the displayed data and relate it to the original geographical model. Recognition, in turn, depends on preserving basic properties, such as shape, orientation, and contiguity. That, however, is difficult to achieve in the general case because it is impossible to retain even the original map's topology. Because the generation of contiguous cartograms by simultaneous optimization of those objectives is difficult, most currently available algorithms are very time-consuming.

Cartograms may be made by contiguous or non-contiguous distortions. The non-contiguous case is much simpler because the input map topology does not have to be preserved. As seen in FIGS. 2A-2H, hand-made non-contiguous cartograms have been made with overlapping or touching circles (FIG. 2D), by eliminating some of the original map's adjacencies (FIG. 2C), or even by drawing disconnected shapes over the original regions (FIG. 2B).

Previous attempts to automate the drawing of contiguous cartograms do not yield results comparable to good hand-made drawings. One reason is that straight lines, right angles and other features considered important in human recognition of cartograms are obliterated. Methods that are radial in nature such as the conformal maps proposed by W. R. Tobler, "Cartograms and Cartosplines," Proceedings of the 1976 Workshop on Automated Cartography and Epidemiology, 53-58 (1976) (FIG. 2A), the radial expansion method of S. Selvin, D. Merrill, J. Schulman, S. Sacks, L. Bedell, and L. Wong, "Transformations of Maps to Investigate Clusters of Disease," Social Science and Medicine, V. 26, no. 2, at 215-221 (1988) (FIG. 2F) and the line integral method of Sabir Gusein-Zade and Vladimir Tikunov, "A New Technique for Constructing Continuous Cartograms," Cartography and Geographic Information Systems, V. 20, no. 3 at 66-85 (1993) (FIG. 2G) do not provide acceptable results, since the shapes of the polygons are heavily deformed. Likewise, the pseudo-cartograms described by W. R. Tobler, "Pseudo-Cartograms," The American Cartographer, V. 13, no. 1 at 43-40 (1986) (FIG. 2E) expand the lines of longitude and latitude to achieve a least root mean square area error. Very similar drawings have been made by approaching the problem as distortion viewing by nonlinear magnification. Radial forces are applied by Charles B. Jackel, "Using Arcview to Create Contiguous and Noncontiguous Area Cartograms," Cartography and Geographic Information Systems, V. 24, no. 2 at 101-109 (1997) to change the size of polygons, moving the sides of each polygon relative to its centroid. That solver, however, runs slowly (e.g., taking 90 minutes to perform 8 iterations on a map of 6 New England states of the U.S.) and seems to have problems with non-convex input polygons and with self-intersections in the output.

Another family of approaches operates on a grid or mesh imposed on the input map. The "piezopleth" method of C. Cauvin, C. Schneider, and G. Chemier, "Cartographic Transformations and the Piezopleth Method," The Cartographic Journal, V. 26, no. 2 at 96-104 (December 1989) transforms the grid by a physical pressure load model. The cellular automaton approach of Daniel Dorling, Area Cartograms: Their Use and Creation, Department of Geography (U. Bristol, England, 1st ed. 1996) trades grid cells until each region achieves the desired number of cells. The combinatorial approach of Herbert Edelsbrunner and Roman Waupotitsch, "A Combinatorial Approach to Cartograms," Computational Geometry 343-360 (1997) computes a sequence of piecewise linear homeomorphisms of the mesh that preserve its topology. While the first method is good at preserving the shape of the polygons, the other two methods allow a very good fit for area but only poor shape preservation.

A synthesis of both approaches was recently described in Christopher J. Kocmoud and Donald H. House, "Continuous Cartogram Construction," Proceedings IEEE Visualization 197-204 (1998) (FIG. 2H). A force-based model is proposed that alternately optimizes the shape and the area error. Although the results are better than most other methods, the complex optimization algorithm has a prohibitively high execution time. For example, 18 hours is required for a modest-sized map with 744 vertices.

The currently available solutions have two major problems: first, the high time complexity of the algorithms restricts their use to static applications with a small number of polygons and vertices. Second, they have very limited shape preservation. Although the recent work by Kocmoud and House provides nice results, some effectiveness problems remain. One problem is the significant deformation of the global shape. In evaluating the different heuristic solutions which have been proposed so far, the present inventors have found that the insufficient preservation of the global shape is one of the most important factors for cartograms to be effective, and it is certainly at least as important as the preservation of interior polygon shapes.

There is presently a need to make dynamic cartograms for on-line network monitoring, such as display of traffic or transaction event levels by country, state, and local regions. That application requires cartogram generation on the fly, and further requires generation of cartograms with maximum preservation of the global shape as well as preservation of the shapes of the interior polygons. To the inventors' knowledge, there is currently no currently available algorithm with adequate speed to perform that function.

SUMMARY OF THE INVENTION

The present invention addresses the needs described above by providing a system, method and computer-readable media for generating a cartogram from a plurality of contiguous polygons having vertices, and from a vector containing values corresponding to the polygons. The method includes the steps of determining a first curvature function of a first polygon, performing a Fourier transform of the first curvature function to calculate a first shape value, repositioning one of the vertices of the polygon to produce an altered polygon, determining an altered curvature function of the altered polygon, performing a Fourier transform of the altered curvature function to calculate an altered shape value, calculating a shape distortion by comparing the first and the altered shape values, and deciding whether to accept the altered polygon based on the shape distortion. Other embodiments include a computer-readable medium for providing instructions to a computing device to generate an image from a plurality of continuous polygons having vertices.

The steps of determining curvature functions of the polygons may include approximating a region surrounding each vertex with a circular arc. The perimeter length may be normalized to $2\pi$ for each polygon, using a radius of $\pi/50$ for the circular arcs. The radius may alternatively be established as smaller than one-half a length of a shortest edge of the polygon.

Each polygon may be represented by a series of concatenated straight lines and radii, the curvature function being a square wave. The steps of determining curvature functions may include normalizing a perimeter length for each polygon. That normalized perimeter length may be $2\pi$.

The steps of performing Fourier transforms may include computing coefficients of Fourier sums analytically. The step of repositioning one of the vertices of the polygon may include selecting the vertices from a set of vertices in a region of the contiguous polygons having two edges orthogonal to a preselected scan line. Each step of the method may then be performed on all vertices within the region.

The vector values may define target area values of the corresponding polygons. In that case, the method further includes the steps of calculating a relative area error of the first polygon by comparing an actual area value of the first polygon with a corresponding target area value, calculating a relative area error of the altered polygon by comparing an actual area value of the altered polygon with the corresponding target area value, and determining whether to revert to the first polygon by comparing the relative area error of the altered polygon and the relative area error of the first polygon. The relative area error of a $j^{th}$ polygon may be defined as $$\frac{|A_{desire}^j - A_{actual}^j|}{A_{desire}^j + A_{actual}^j},$$

wherein $A_{desire}^j$ is a target area value for the $j^{th}$ polygon and $A_{actual}^j$ is an actual area value for that polygon.

The method may further include an initial step of selectively removing at least one vertex from the plurality of contiguous polygons. The vertices may be selected based on a proximity to 180 degrees of an angle formed by adjacent edges, or may be selected based on a length of an adjacent edge. All interior vertices not common to more than two polygons may be removed. The interior vertices may be removed based on criteria different from those used to remove vertices on a global polygon.

In another embodiment of the invention, a cartogram is generated from a map having a plurality of contiguous map polygons with vertices. The cartogram has a plurality of cartogram polygons corresponding to the map polygons, the cartogram polygons having areas proportional to values contained in a data vector. That method includes the steps of selecting a vertex for repositioning, the vertex having adjacent polygons, repositioning the selected vertex, determining an area error of the adjacent polygons based on corresponding data vector values, determining a shape error of the adjacent polygons based on a Fourier transformation of a curvature function of a perimeter of each polygon, and deciding whether to accept or reject the repositioning step based on the shape error and the area error.

The curvature function may include circular arcs approximating regions surrounding each vertex of the polygons. In that case, a perimeter length of $2\pi$ may be normalized for each polygon, in which case a radius of the circular arcs is $\pi/50$. Alternatively, the radius may be smaller than one half a length of a shortest edge of the polygon.

Each polygon may be represented by a series of concatenated straight lines and radii, in which case the curvature function is a square wave. The curvature function may be normalized to a predetermined perimeter length, which may be $2\pi$.

Fourier sums may be analytically computed from the Fourier transforms. The step of selecting a vertex may include selecting the vertex from a set of vertices in a region of the contiguous polygons having two edges orthogonal to a preselected scan line. Each of the steps may be performed on all vertices within the region.

The area error of a $j^{th}$ polygon may be defined as $$\frac{|A^j_{desire} - A^j_{actual}|}{A^j_{desire} + A^j_{actual}},$$

wherein $A_{desire}^j$ is a target area value proportional to values contained in the data vector for the $j^{th}$ polygon and $A_{actual}^j$ is an actual area value for that polygon.

As with the previous embodiment, the method may further include the initial step of selectively removing at least one vertex from the plurality of contiguous polygons.

BRIEF DESCRIPTION OF THE DRAWINGS

FIG. 3 is a partial map of the United States illustrating a vertex/edge notation convention.

FIGS. 4A-4G are sample polygons illustrating shape and topology distortion.

FIG. 5 is a table showing possible constraints for cartogram drawing.

FIGS. 6A & 6B are sample polygons showing shape and topology properties.

FIG. 7 is a table showing possible global polygon constraints for cartogram drawing.

FIG. 8 is a plot of a significance function used in the present invention.

FIG. 9 is an algorithm for reducing global vertices according to the invention.

FIG. 10 is an algorithm for reducing interior vertices according to the invention.

FIG. 14 is a scanline algorithm according to the invention.

FIG. 16 is an algorithm for drawing cartograms according to the invention.

DESCRIPTION OF THE INVENTION

Figure 1A:
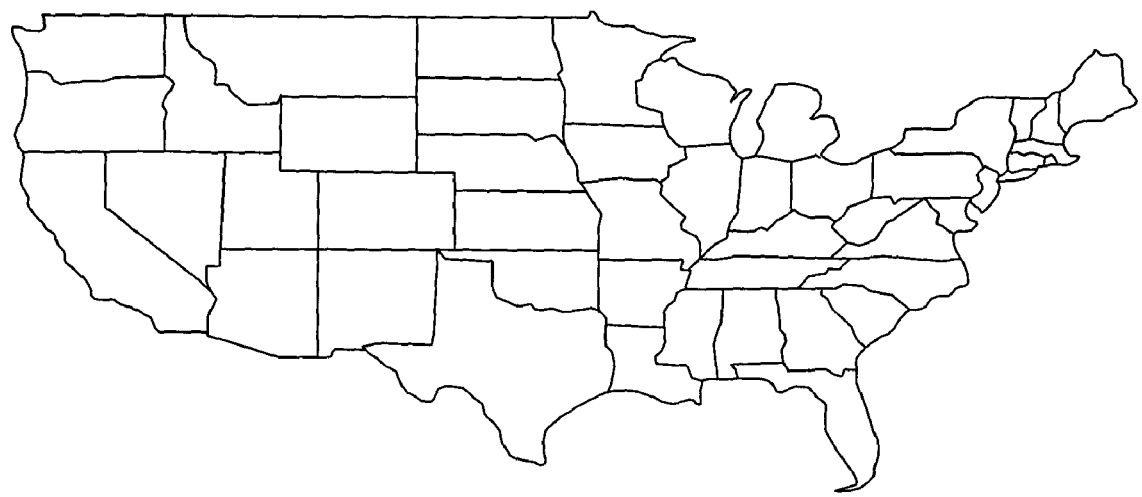
FIG. 1A is a traditional map of the United States.
Figure 1B:
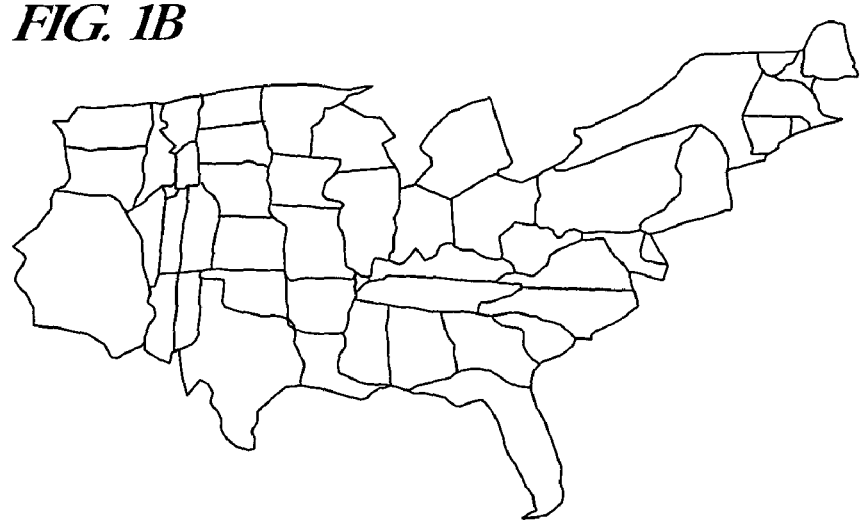
FIG. 1B is a population cartogram of the United States generated using the method of the invention.
Figure 2A:
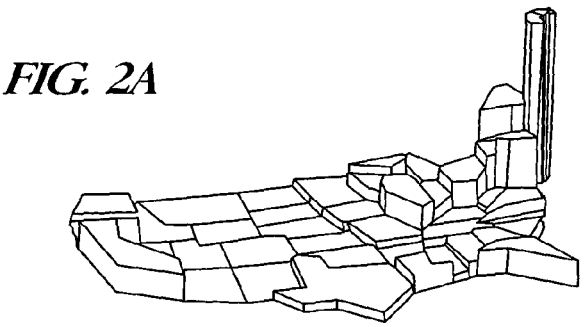
FIGS. 2A-2H are views of cartograms and pseudo-cartograms generated by prior art methods.
Figure 2B:
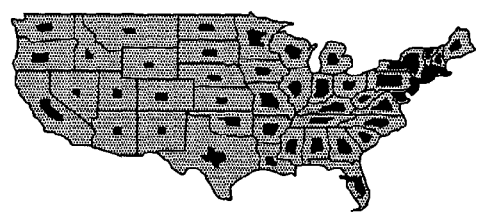
Figure 2C:
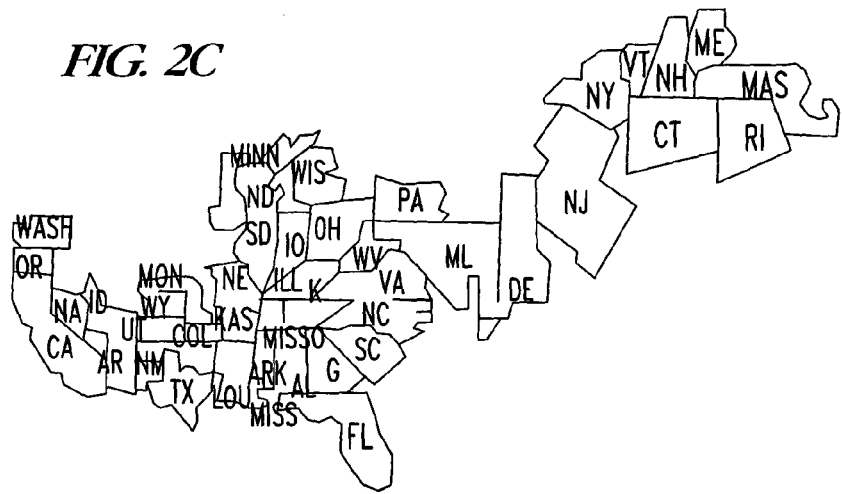
Figure 2D:
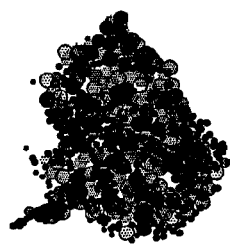
Figure 2E:
Figure 2F:
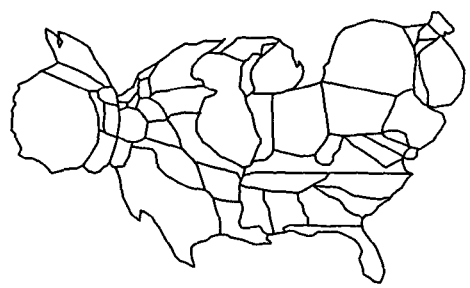
Figure 2G:
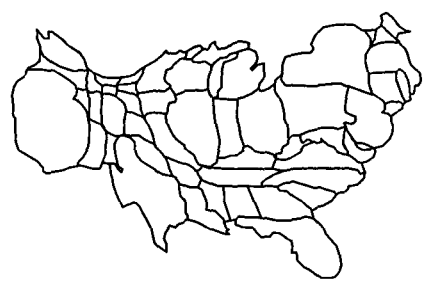
Figure 2H:

The contiguous cartogram problem may be defined in terms of an ideal solution and topology preservation. It is assumed that the input to the method of the invention is a map defined by a set of connected simple polygons (a polygonal mesh) P, and a parameter vector $\vec{X}$ that gives the desired values for the proportional area of each polygon. The goal is to generate contiguous cartograms and therefore, the desired output also is a set of connected simple polygons $\overline{P}$. Let $|p|$ denote the number of vertices, $A(p)$ the area, and $S(p)$ the shape of a polygon $p$, and $T(P)$ the topology of a set of polygons. Then, the ideal solution of the Contiguous Cartogram Drawing problem can be defined as follows.

A contiguous Cartogram of a set of connected polygons $P=\{p_1, \ldots, p_k\}$ with respect to the parameter vector. $\vec{X}=\{x_1, \ldots, x_k\}$, $(\forall j x_j > 0)$, is a visualization of the transformed set of polygons $\overline{P}$, where $T(\overline{P})=T(P)$ (Topology Preservation), $S(\overline{p}_j)=S(p)$, $\forall j=1, \ldots, k$ (Shape Preservation), $A(\overline{p}_j)=\tilde{x}_j$, $\forall j=1, \ldots, k$ (Area Resizing).

The desired area $\tilde{x}_j$ of a polygon $p_j$ is defined as $$\tilde{x}_j = x_j \cdot \frac{\sum_{i=1}^{k} A(p_j)}{\sum_{j=1}^{k} x_j}.$$

To simplify the description, the following assumes that there is only one set of connected polygons (such as the continental United States) and not multiple unconnected sets (such as a world map). The definitions, however, may easily be extended to multiple polygonal meshes. The heuristic herein described operates on arbitrary maps.

Let $v_j^i$ denote the i-th vertex of polygon $p_j$, $a_j^i$ the angle at the i-th vertex, $e_j^i$ the i-th edge, $|e_j^i|$ the length of edge $e_j^i$, and $CE(v)$ the cyclic order of edges at vertex $v$, as defined by the notation shown in FIG. 3.

If it is assumed that the transformed polygons have the same number of vertices (i.e., $|\overline{p}_i|=|p_i|$), then one way of formalizing the topology and shape preservation constraints is to formalize the preservation of connecting vertices and the preservation of edge length ratios and angles.

As to the preservation of connecting vertices, the topology preservation $T(\overline{P})=T(P)$ means that for each vertex $v \in \overline{P}$ the cyclic order of edges remains the same as in P. More formally, $$\forall v_j^i \in P, j=1, \ldots, k; i=1, \ldots, |p_j|: \exists \overline{v}_j^i \in \overline{P}, j=1, \ldots, k;\\ i=1, \ldots, |\overline{p}_j|: CE(v_i^j)=CE(\overline{v}_i^j)$$

If the cartogram construction algorithm does not provide a mapping to the original polygon set, topology preservation is difficult to test, because as a first step, the isomorphism problem between the two corresponding graphs must be solved. Graph isomorphism is a difficult problem and, therefore, efficient solutions have to maintain the topology of the original polygon mesh or provide a mapping to the original polygon mesh.

As to the preservation of edge length ratios and angles, shape preservation $S(\overline{p}_i)=S(p_i)$ means that the edge length ratios of the polygons and the angles are preserved $$\forall j=1, \ldots, k \exists c_j \in R: |\overline{e}_j^i|=c_j|e_j^i|, i=1, \ldots, |p_j|, e_j^i \in P, \overline{e}_j^i \in \overline{P}, \quad (i)$$

$$\forall j=1, \ldots, k, \forall i=1, \ldots, |p_j|: \overline{\alpha}_j^i = \alpha_j^i. \quad (ii)$$

As a simple example, a map with the topology of a checkerboard (FIGS. 4A & 4D) is resized according to the color of the fields, scaling white fields by a factor of 1.5 and black fields by a factor of 0.5. That rescaling is impossible without changing the topology or shapes. In the case of the 2×2 grid, FIG. 4B shows solutions in which shape was maintained but topology was relaxed; FIG. 4C shows relaxed shape. In the case of the 3×3 grid, FIG. 4E shows relaxed topology, FIG. 4G shows relaxed shape and FIG. 4F shows both characteristics relaxed. In general, it is impossible to achieve the ideal solution. That observation may be stated as follows: the above-described cartogram drawing problem is unsolvable in the general case; i.e., there exist sets of polygons and parameter vectors such that it is impossible to obtain an ideal solution. The checkerboard topology of FIG. 3 provides an example of such a set of polygons for which there is no ideal cartogram solution.

To derive feasible variants of the problem, some of the feature preservation conditions must be relaxed. If topology is the most important property to maintain, the only other conditions left to relax are the shape and area constraints. Those are explored in terms of two distance functions—an area distance function (which measures the distance of the area of a polygon from the desired size, typically, difference in area in the Euclidean plane) and a shape distance function (which measures the similarity of two shapes). FIG. 5 is a table containing an enumeration of possible constraints. The first column 51 lists constraints that require a maximum distance for each polygon, the second column 52 lists constraints that require a maximum distance for the sum of the distances of all polygons, and the third column 53 lists minimum constraints for the sum of distances. By combining the different area and shape constraints shown in FIG. 5, variants of the cartogram drawing problem may be constructed. A useful combination would be, for example, a restriction of the solution space to solutions where the shape of each polygon has at least a certain similarity to its original shape and the sum of all area differences is minimal. The following discussion relates to the different variants of the problem and their complexity.

As noted above, in general it is impossible to find an ideal solution of the cartogram drawing problem. It is furthermore noted that any variant of the cartogram drawing problem that involves the single-polygon area constraint or the all-polygon area constraint, as tabulated in FIG. 5, is also unsolvable in the general case, i.e. there exist sets of polygons P and parameter vectors $\vec{X}$, such that for any $\epsilon$ the problem variants do not have a valid, topology-preserving solution.

FIG. 6A is an example of a symmetric cartogram consisting of seven polygons. If the parameter vector for scaling the polygons requires the light polygons to become larger and the dark ones to become smaller, an impossible case can easily be constructed. Due to the symmetric construction of the polygons, without loss of generality we can assume that one angle $$\gamma \leq \frac{\pi}{3}.$$

Thus, $$\alpha = 2\pi - 2\beta - \gamma \geq 2\pi - 2\beta - \frac{\pi}{3}$$

For the above mentioned resize requirements (triangle A very large and triangles B very small), $\beta \to 0$ and therefore $$\alpha \geq 2\pi - \frac{\pi}{3} = \frac{5}{3}\pi \Rightarrow \alpha > \pi$$

and thus the topology cannot be preserved, as shown in FIG. 6B.

That means that only variants of the problem that use the minimum-area condition are solvable, and that is true for any combination with a shape constraint. The solvability is trivial to see since there is at least the identity solution, which yields a perfect shape preservation but a rather bad value for the area difference. As the following shows, the determination of the actual solution with the minimum area difference, however, is a computationally hard problem.

Any variant of the cartogram drawing problem that involves the minimum-area condition is NP-complete. That may be shown using a constrained, simplified version of the cartogram problem called the "integer cartogram problem." The proof shows that a solution to the integer cartogram problem would imply a solution of the planar 3-SAT problem which is known to be NP-hard.

In using the integer cartogram variant of the problem one easily observes that there is little freedom to improve the second important parameter, namely the shape. In most cases, the minimum area condition will provide some solution that is best optimized according to the area condition but does not take the shape similarity into account. There might be, for example, a solution that much better preserves the shape but is a little bit worse in area. To allow the shape constraint to have an impact on the solution, the constraints must be adapted. In principle, there are two possibilities. The first is to determine the minimum area difference possible and then allow a certain maximum deviation from this minimum difference for finding the best shape. More formally, this may be defined by defining two variants of the contiguous cartogram problem.

First, given a set of polygons P, a parameter vector $\vec{X}$, and an error value $\epsilon$, the contiguous cartogram problem may be defined as a transformed set of polygons $\overline{P}$ for which the following two conditions hold:

$$\sum_{j=1}^{k} d_A(\tilde{x}_j, A(\overline{p}_j)) \leq \underset{\overline{\mathcal{P}}}{\text{MIN}}(d_A(\tilde{x}_j, A(\overline{p}_j))) + \varepsilon \quad (1)$$

$$\sum_{j=1}^{k} d_S(S(p_j), S(\overline{p}_j)) \overset{!}{\longrightarrow} \min \quad (2)$$

Alternatively, the area and shape distances may be normalized and a weighted mean of the normalized distances may be used as a combined optimization criterion.

Second, given a set of polygons P, a parameter vector $\vec{X}$, and importance factors for the area and shape distances, the contiguous cartogram problem may be defined as the transformed set of polygons $\overline{P}$ for which $$a \cdot \sum_{j=1}^{k} d_A(\tilde{x}_j, A(\overline{p}_j)) + b \cdot \sum_{j=1}^{n} d_S(S(p_j), S(\overline{p}_j)) \overset{!}{\underset{a,b \geq 0}{\longrightarrow}} \min.$$

There are other meaningful and solvable variants of the problem that, for example, also include the single-polygon constraints, as demonstrated by the table of FIG. 5. Most currently available algorithms try to solve the problem according to one of the two variants above. While that seems sufficient for some applications, there are others where additional constraints seem necessary.

In addition to the shape and area constraints discussed above with reference to FIG. 5, the inventors have found that the global shape is one of the most important factors for cartograms to be effective, and it is certainly at least as important as the preservation of interior polygon shapes. In the definition of the cartogram drawing problem, besides the shape and area constraints discussed above, the inventors therefore explicitly include a global shape constraint which may be again either a single-polygon, all-polygon, or minimum constraint for the global shape(s) (note that there may be multiple global shapes as they occur, for example, on a world map). If $G_r(P)(r=1 \ldots 1, 1 \leq k)$ denotes the set of global polygons that may be derived from the set of polygons P, the global shape constraints may formally be described as given in the table of FIG. 7. The final definition of the cartogram drawing problem below uses a weighted minimum of area, shape, and global shape constraints.

Given a set of polygons P, a parameter vector $\vec{X}$, and importance factors for the area, shape, and global shape constraints a, b, and c, the contiguous cartogram problem may be defined as a transformed set of polygons $\overline{P}$ for which $$a \cdot \sum_{j=1}^{k} d_A(\tilde{x}_j, A(\overline{p}_j)) + b \cdot \sum_{j=1}^{k} d_S(S(p_j), S(\overline{p}_j)) +$$

$$c \cdot \sum_{r} d_S(S(G_r(P)), S(G_r(\overline{P}))) \overset{!}{\underset{a,b,c \geq 0}{\longrightarrow}} \min$$

Turning to some observations crucial for an efficient solution of the problem, one important observation is that in practice, only very few vertices are actually important for defining the shapes of the polygons. In considering the U.S. map, for example, the inventors found that in addition to a restricted number of outer vertices, only a limited number of interior vertices are actually relevant. Note also that the importance of polygons and their vertices largely depends on their size (which is directly related to the parameter vector) and on the length of the edges and the angles between them. In the inventive algorithm, special consideration is given to those facts and the importance of vertices is determined based on those observations. A second observation is that, in order to obtain good results, the shape error has to be controlled explicitly. A last observation is that the high time complexity of most algorithms proposed previously is due to a complex and time-consuming optimization. In most cases, however, it is possible to locally reposition vertices and improve the area error while retaining the shape. To obtain good solutions, the algorithm of the present invention iteratively repositions vertices based on scanline-defined locality measures with an explicit shape error control function.

The objective of the cartogram drawing algorithm of the invention is a fast generation of cartograms of acceptable quality. Because input maps often have far more vertices than are needed to compute good cartograms, the first step is an intelligent decimation. That is followed by the central heuristic, scanline-based repositioning of vertices. Vertices of the global polygon(s) are first repositioned, followed by interior vertices. Scanlines can be restricted to vertical and horizontal lines determined automatically, or may be arbitrarily positioned line segments of any length, entered interactively. In each step, the shape of the modified polygon mesh is controlled by the shape error function. The last step is fitting the undecimated polygons to the decimated mesh to obtain the output cartogram. By exploiting the potential for pre-computation and fast local optimization, the inventive algorithm runs quickly enough to support dynamic displays with high update rates on maps having dozens of polygonal regions.

Edge reduction algorithms used in the inventive method will now be discussed. As noted, preserving the global shape is very important in making recognizable cartograms. Decimation algorithm of the invention takes that into account by simplifying the global and inner polygons differently.

Regarding reduction of the global polygon, a key observation is that the importance of the vertices of a polygon can vary greatly. Vertices on angles near 180 degrees and those with short edges make almost no noticeable difference in the shape of a polygon, while others with sharp angles or long edges have a significant effect. The basic idea of the global polygon reduction algorithm is to rate the importance of each vertex according to those criteria. Then, iteratively, the least important vertices are removed. To maintain the topology, only vertices that do not belong to multiple polygons are removed. To formalize the global reduction algorithm, the notion of a vertex's importance is first defined as $$I(v) = Sig(\alpha^v) \cdot |e_1^v| \cdot |e_2^v|$$

where $e_1^v$ and $e_2^v$ are the two edges of vertex v and $Sig(\alpha^v)$ is a function denoting the significance of the angle $\alpha^v$ at vertex v. The significance function $Sig(\alpha)$ is important because different angles have a specific impact on the shape of the polygons. Sharp angles and angles close to 90 degrees are more important than obtuse angles and the significance function therefore assigns higher values to sharp angles and lower values for obtuse angles. For our algorithm, we use $$Sig(\alpha) = \sum_{\mu \in \{0,90,270,360\}} \exp \frac{(\alpha-\mu)^2}{2\sigma^2}$$

as the significance function. That function has peaks for $\alpha=0$, 90, 270, 360 degrees and is close to zero for $\alpha=180$ degrees. The function is defined for $\alpha=]0°, 360°[$ and $\sigma$ is chosen to be $0.2\cdot\pi$. FIG. 8 shows a plot of that function.

To formalize the global reduction algorithm, the global polygon is first defined as a subset of the vertices of P. For each polygon $p_j$, $j=1 \ldots k$, the portion $gp_j$ of the global polygon GP can be defined as $$gp_j = \{v \in p_j : |edges(v)| > |polygons(v)|\}$$

The global polygon is defined as $$GP = \bigcup_{j=1 \ldots k} gp_j.$$

The algorithm for the reduction of the global polygon is shown in FIG. 9. The algorithm initializes V (step 91) so that vertices are only considered for removal if they do not belong to multiple polygons. Vertices are removed if the induced area difference is smaller than a given constant MaxAreaDiff (step 92). Note also that the area $A_s(p)$ of a polygon p is determined as if the polygon is perfectly scaled according to the parameter vector X and the area difference $\|A_s(p_1) - A_s(p_2)\|$—the subscript s of $A_s$ stands for scaled—is defined as $$\|A_s(p_1) - A_s(p_2)\| := (A_s(p_1) \cup A_s(p_2)) \setminus (A_s(p_1) \cap A_s(p_2))$$

To position interior vertices, an iterative vertex removal may again be used. A more efficient alternative is based on the observation that for most maps only the connecting interior vertices are important. In the preferred embodiment, instead of iteratively removing unimportant interior vertices, a more direct approach is taken by removing all vertices not common to more than two polygons (non-connecting vertices). In some cases, the shape deformation and area error introduced by that reduction is unacceptably high. A few additional vertices are therefore re-introduced. The complete algorithm is shown in FIG. 10.

Figure 11A:
FIGS. 11A-11C are maps of the United States showing reduction in vertices according to the invention.
Figure 11B:
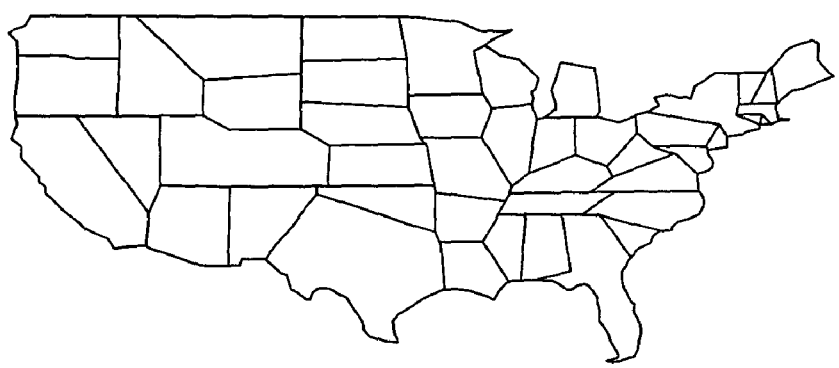
Figure 11C:
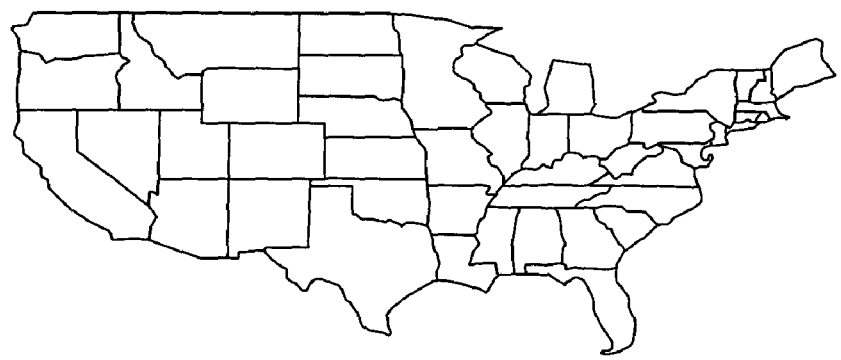

As an example of the reduction technique of the invention, the interior vertices of a polygon mesh containing 743 interior vertices (FIG. 11A) are reduced to only the 204 interior vertices common to more than two polygons (FIG. 11B). A few additional vertices are re-introduced in the final polygon containing 343 interior vertices (FIG. 11C). In practice, only a few polygons need the additional vertices, so the likelihood of re-introducing vertices that were removed is low.

The main cartogram drawing algorithm will now be discussed. The algorithm incrementally repositions the vertices along a series of scanlines. A scanline is a line segment of arbitrary length and position. Each scanline defines a scan section, orthogonal to the scanline. All points within a scan section are repositioned in a single step. For each section on a scanline, a target scaling factor for each of its polygons is determined according to their area error factors. Vertices are then repositioned according to the polygon scaling factors and distances to the scanline. The repositioning may be parallel or orthogonal to the scanlines. If the shape error introduced by applying a scanline exceeds some threshold, its candidate vertex repositionings are discarded.

Scanlines should be applied to parts of the map where the area error is large and there is still potential for improvement. A simple approach to scanline generation is to use horizontal and vertical line segments positioned on a regular grid. Significantly better results can be obtained by a manual scanline placement, guided by the shape of the input polygons and the local potential for improvement. Note that the incremental repositioning of vertices per scanline application is intentionally small, compared to the expected change in area. That means the same scanline may need to be applied many times to make large adjustments in an area.

Before describing the main algorithm, its three main components will be introduced: the area error function, the shape similarity function, and the scanline algorithm.

The area error function is directly related to the objective of cartogram generation; i.e., to obtain a set of polygons where the area of the polygons corresponds to values given in a data vector X. In each step of the algorithm, the area error function is needed to determine the reduction of the area error achieved by applying a given $$E_{rel}^j = \frac{|A_{desire}^j - A_{actual}^j|}{A_{desire}^j + A_{actual}^j}$$

Hence, the area error for the set of polygons P is defined as $$E_{rel}^{\mathcal{P}} = \sum_{j=1}^{k} \left( E_{rel}^j \cdot \frac{A_{desire}^j}{\sum_{j=1}^{k} A_{desire}^j} \right)$$

In addition to reducing area error, the cartogram generation process also employs a shape similarity function that aims at retaining the original shapes. To assess shape preservation, a shape similarity function is needed that compares the new shape of a polygon with its original shape. Defining a useful shape similarity function is in itself a difficult problem, since the similarity measure should be translation-invariant, scale-invariant, and at least partially rotation-invariant. From CAD research it is known that the Euclidean distance in Fourier space is useful for measuring shape similarity. To gain invariance against translation, rotation, and scaling, the algorithm uses the Fourier transformation of the differential geometric curvature of the polygons, instead of the polygons themselves, and normalizes the arc length of the polygons to $\Box \pi$. Using the curvature guarantees translation- and rotation-invariance, and normalizing the arc length guarantees scale-invariance.

In the following, it is assumed that the polygons are transformed into a normalized parameterized polygon contour function $p:[0,2\pi] \rightarrow \mathfrak{R}^2$. Then, curvature C of the polygons may be defined as $$C:(\mathfrak{R} \rightarrow \mathfrak{R}^2) \rightarrow (\mathfrak{R} \rightarrow \mathfrak{R}^2).$$

The Fourier transformation F is a transformation $$F:(\mathfrak{R} \rightarrow \mathfrak{R}^2) \rightarrow \mathfrak{R}^d,$$

determining the Fourier coefficients for a given curvature function in d-dimensional Fourier space. The shape similarity of two polygons p and $\bar{p}$ can then be defined as $$d_S(S(p), S(\bar{p})) = d_{Euclid}(F(C(p)), F(C(\bar{p}))).$$

In the following, the curvature transformation C and the Fourier transformation F are described in more detail.

Figure 12A:
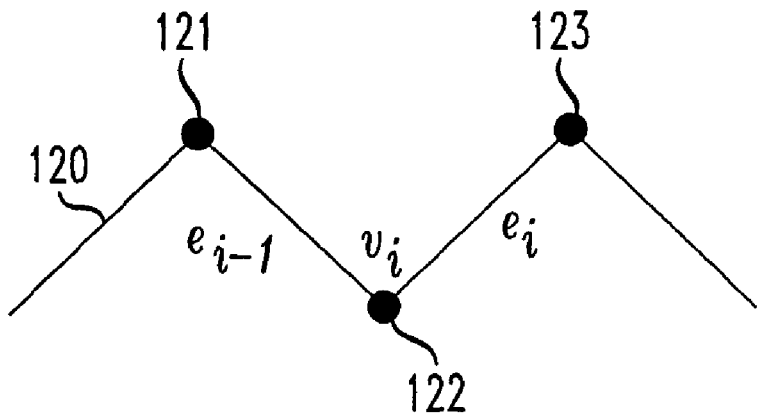
FIGS. 12A & 12B are sample polygons showing geometry simplification according to the invention.
Figure 12B:
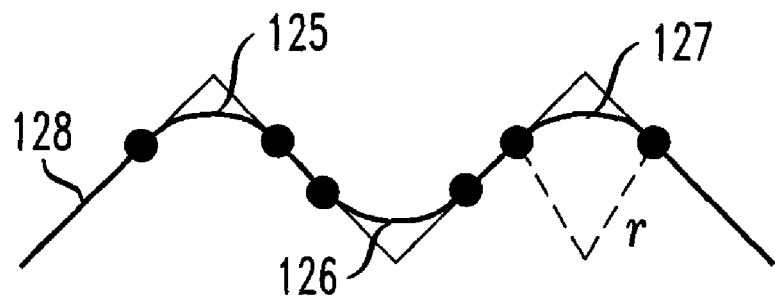
Figure 12C:
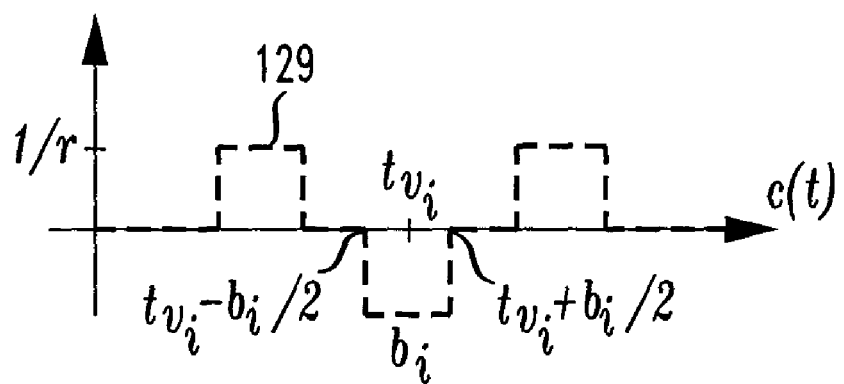
FIG. 12C is a curvature plot of the polygon of FIG. 12B.

In general, the curvature of a polygon defined as a parameterized function is mathematically undefined because the second derivative is not continuous. That problem can be avoided by approximating a polygon 120 (FIG. 12A) by replacing each vertex 121, 122, 123 with a very small circular arc 125, 126, 127, shown in FIG. 11B. That yields a new geometric object 128 of which the first derivative is continuous. The curvature of that object is defined in sections; concatenating those sections yields the curvature as square wave function 129 (FIG. 12C).

To describe the curvature transformation in more detail, this discussion will focus on two adjacent edges $e_{i-1}$ and $e_i$. Those edges coincide in vertex $v_i$ with an angle $\alpha_i$. For the polygon containing $v_i$, the curvature function $c_i(t)$, describing the differential geometric curvature of the approximated polygon, may be easily computed, because the curvature of a circle segment with radius r is a constant function 1/r and the curvature of a straight line is a constant zero function. The arc length of the circle segment may be calculated by substituting vertex $v_i$ by $b_i = |\alpha_i| \cdot r$. For $c_i(t)$, we therefore obtain $$c_i(t) = \begin{cases} 1/r & \text{if } (t_{v_i} - b_i/2 > t > t_{v_i} + b_{i/2}) \\ 0 & \text{otherwise} \end{cases}$$

Figure 13A:
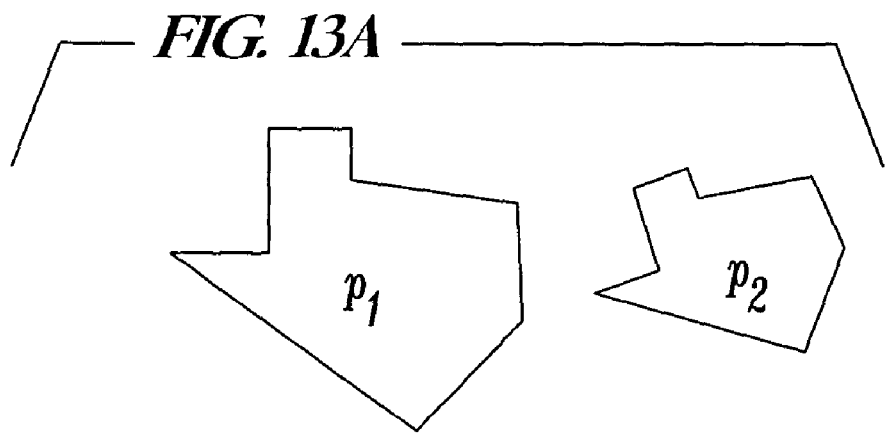
FIGS. 13A & 13B show polygons and corresponding curvature plots according to the invention.
Figure 13B:
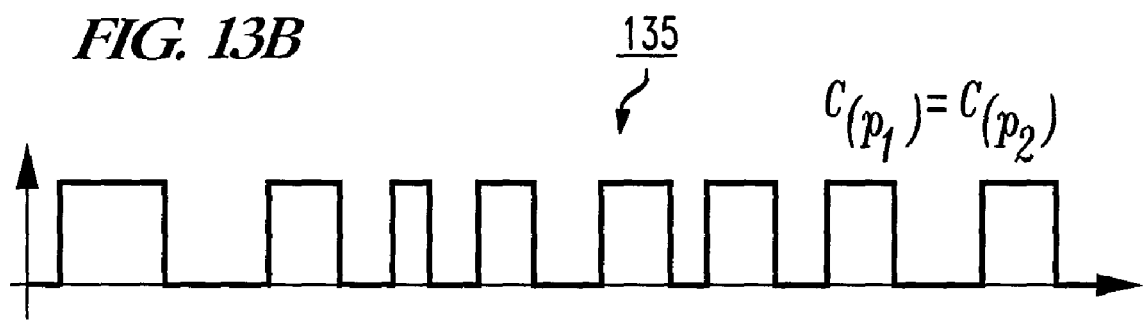

The curvature of an arbitrary polygon p is $c(t) = \sum_{k=0}^{|p|-1} C_k(t)$. An example of a graph of the curvature function c(t) for the approximation of the polygon section of FIG. 12A is shown in FIG. 12C. In another example, the curvature function 135 of FIG. 13B is identical for two polygons $p_1$ and $p_2$ shown in FIG. 13A under translation-invariance, rotation-invariance, and scale-invariance.

The approximation of the original polygon, and in particular the choice of r, influences the curvature function. If the radius r of the circle segment is reduced, 1/r will be increased while $b_i$ will be decreased. That causes c(t) to become narrower and the amplitude of square waves to become higher, while the approximation of the polygon converges against the polygon itself. On the other hand, c(t) becomes difficult to handle numerically. An adequate value for r that has proven useful for our application is $\pi/50$ for polygons with a normalized length of $2\pi$. The inventors have found that the similarity function is quite robust against a sub optimal choice of r, as long as r is smaller than half of the length of the shortest edge since otherwise individual square wave functions may overlap.

The next step is computing the Fourier transformation F of the curvature. The principle of the Fourier transformation is to approximate a function by summing up sine and cosine functions with certain parameters. The quality of the approximation is improved by increasing the degree d of the Fourier approximation, which means to successively sum up cos(x), sin(x), cos(2x), sin(2x), ..., cos(kx), sin(kx). More formally, the Fourier approximation of a function f with a period of $2\pi$ is defined as $$F(x) = \frac{a_0}{2} \sum_{k=1}^{n} (a_k \cos(kx) + b_k \sin(kx))$$

where the coefficients $a_k$ and $b_k$ are defined as $$a_k = \frac{1}{\pi} \int_o^{2\pi} f(x)\cos(kx)\,dx \text{ and } b_k = \frac{1}{\pi} \int_o^{2\pi} f(x)\sin(kx)\,dx.$$

In general, integrals of the form $\int f(x)\sin(x)dx$ are difficult to solve analytically. For the special case where $f(x)$ is a square wave function, however, the integral can be easily determined. Let us assume that $f(x)$ has a value of 1/r in the interval [u,v] and is zero elsewhere. Since the value of the integral is zero outside of [u, v] it is necessary to integrate only from u to v. Therefore, it is possible to calculate $a_k$ and $b_k$ as $$a_k = \frac{1}{\pi k r}(\sin(kv) - \sin(ku)) \text{ and } b_k = \frac{1}{\pi k r}(\cos(kv) - \cos(ku)).$$

To determine the Fourier coefficients of the curvature function c(t) of the whole polygon p, we only have to sum up the above formula $c_i(t)$ for all vertices vi of the polygon. We obtain the following formulas for the Fourier coefficients:

$$a_k = \frac{1}{\pi k r} \sum_{i=0}^{|p|-1} \frac{\alpha_i}{|\alpha_i|} \left( \sin\left(k\left(t_i + \frac{|\alpha_i r|}{2}\right)\right) - \sin\left(k\left(t_i - \frac{|\alpha_i r|}{2}\right)\right) \right)$$

$$b_k = \frac{1}{\pi k r} \sum_{i=0}^{|p|-1} \frac{\alpha_i}{|\alpha_i|} \left( \cos\left(k\left(t_i + \frac{|\alpha_i r|}{2}\right)\right) - \cos\left(k\left(t_i - \frac{|\alpha_i r|}{2}\right)\right) \right)$$

The calculation of $a_k$ and $b_k$ can be done in $O(|p|)$ time, and the calculation of all coefficients can be done in $O(|p| \cdot d)$, where d is the degree of the Fourier sum. Note that it is possible to compute the coefficients of the Fourier sum analytically, and therefore not to run into numerical problems such as finding the right sample rate. Experimental results show that the Fourier transformation provides a good approximation of the polygons and their curvature function even for rather small d.

An important feature of the cartogram drawing algorithm of the present invention is the scanline heuristic, which incrementally repositions vertices along scanlines. A scanline sl is a line segment of arbitrary position and length and is partitioned into n portions of length $$\frac{|sl|}{n}.$$

Figure 15A:
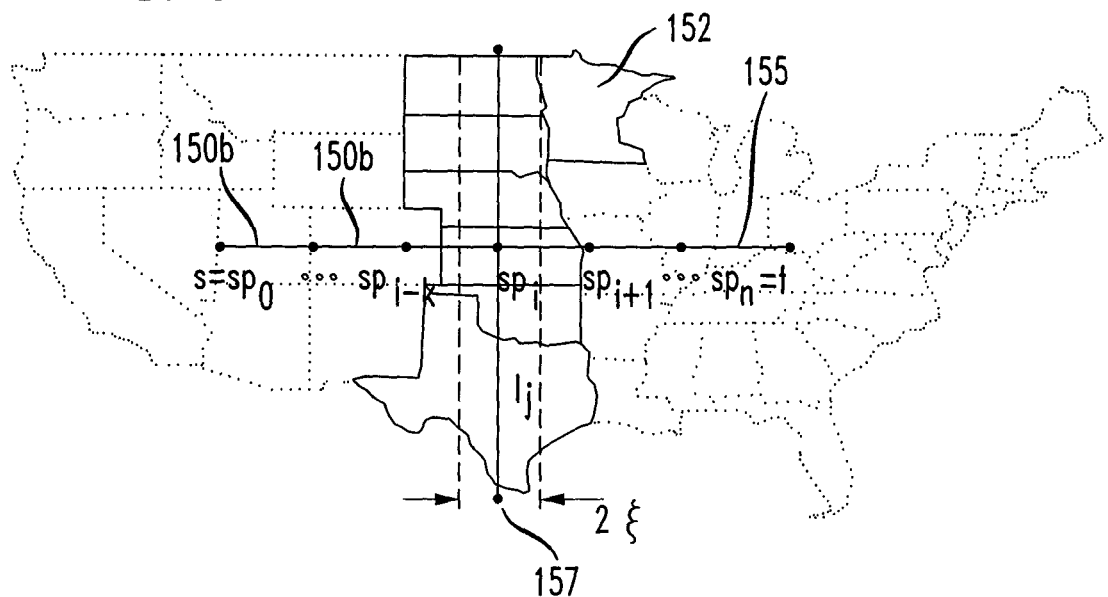
FIGS. 15A & 15B show sample scanlines and associated parameters according to the invention.

As shown in FIG. 15A, the scanline section points $sp_i$ (i = 0 ... n) define n+1 sections (e.g., sections 150a, 150b) of the polygon mesh 152, which are orthogonal to the scanline 155. In one step of the scanline algorithm, all vertices $v \in V_i$ within a certain distance (distance 157)

$$\left(\xi = \frac{|sl|}{2n}\right)$$

of $l_i$ are considered for incremental repositioning. Let $SF_i$ be the set of polygons (by index number) that have at least one vertex in scanline section i (i=0 ... n). Then, the scaling factor $SF_i$ is determined according to the area error of all polygons p in section i:

$$SF_i = const \cdot \sum_{r \in S_i} \left( \frac{\tilde{x}_r - A(p_r)}{\tilde{x}_r + A(p_r)} \cdot \frac{\tilde{x}_r}{\sum_{l \in S_i}^{n} \tilde{x}_l} \right).$$

Figure 15B:
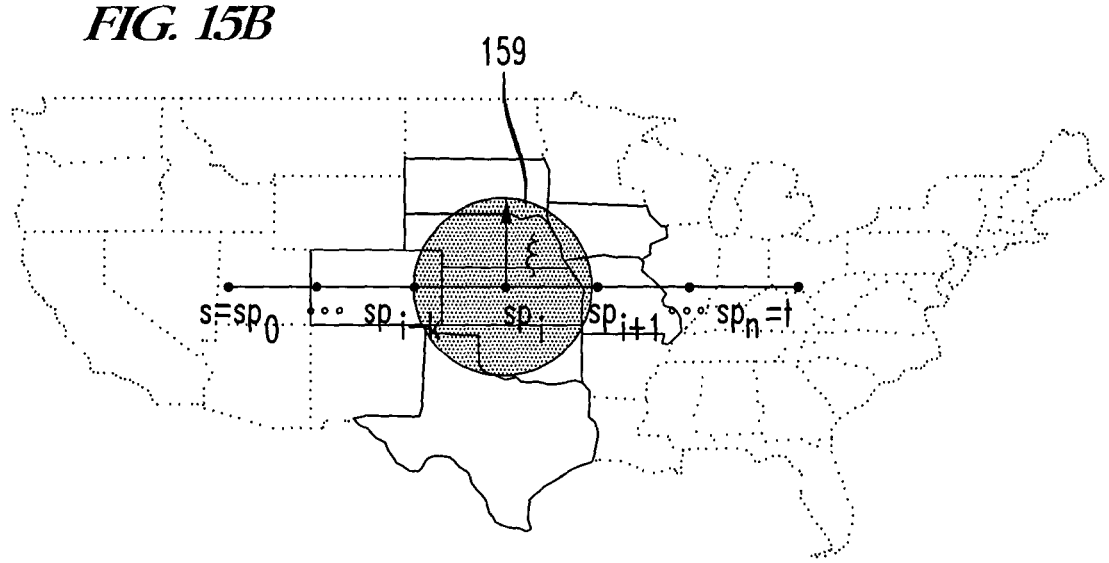

Next, the direction o(v) of a vertex v is determined and the scaling factor $SF_i$ is applied to reposition the vertex. The repositioning can be done either in the direction of the scanline (direction=scanline) or in the direction of the section line $l_i$ (FIG. 15A). The algorithm is shown in FIG. 14. In a preferred embodiment, the scanline sections span the full range orthogonal to the scanline of the polygon net. Alternatively, the changes may be restricted to be local in both directions by limiting the considered polygons to those close to the scanline, for example, within a circle 159 (FIG. 15B) of radius ξ. That option is not reflected in the algorithm shown in FIG. 14.

Having defined the components of the cartogram drawing algorithm, the main procedure is now described. The algorithm assumes as input a set of polygons P, a scaling vector of the desired statistical parameter $\tilde{X}$ and a set of scanlines SL, which can be determined automatically or manually as described below. Output is the modified set of polygons P that describes the cartogram. The algorithm is shown in FIG. 16 and works as follows. For each scanline (step 160), the algorithm applies the scanline transformation (step 161) and checks the results (step 162). If the area difference $E_{rel}$ introduced by the scanline transformation is below a certain threshold EA and the shape distortion is below a certain threshold $\epsilon_s$, then the changes are retained and otherwise discarded. Then, the algorithm proceeds with the next scanline until all scanlines are applied in the same way. At that point, the algorithm checks whether in applying all scanlines an improvement of the area error has been obtained. If that is the case, the algorithm applies all scanlines again and repeats the entire procedure until no further improvement is reached (step 165) (area improvement below $\epsilon$). Since the area error improvement must be positive and above the threshold e in each iteration, the area error is monotonously decreasing and termination of the algorithm is guaranteed. Note that in applying an individual scanline, the algorithm is allowed to potentially increase the area error, to allow escaping local optima. Also, notice that after applying a scanline, all the other ones remaining to be processed must be transformed as well, so that they correspond properly to the transformed map.

Figure 17A:
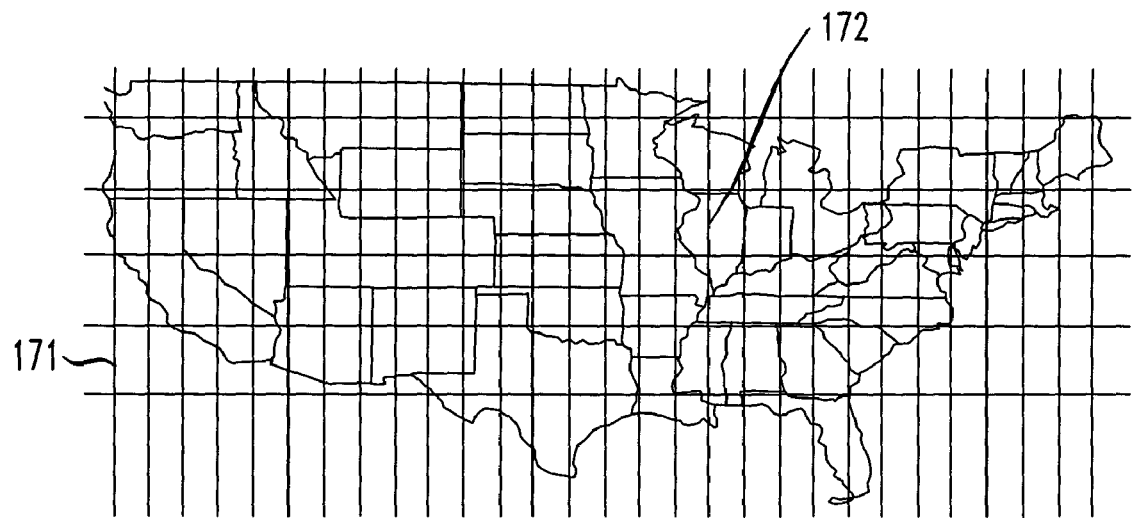
FIGS. 17A & 17B show a map of the United States with scanlines placed according to two embodiments of the invention.

The set of scanlines SL used by the algorithm may be defined either automatically or interactively. The automatic generation of scanlines uses a fixed grid of horizontal and vertical scanlines. An example of an automatically generated scanline grid 171 generated to cover a polygon grid 172 representing the continental United States is shown in FIG. 17A. The grid's resolution may be varied, but within reason that has only a minor influence on the result. Because only those scanlines that do not induce a higher shape and area error are applied, generating many useless scanlines causes a potential loss in efficiency, but does not affect the quality of the result.

Figure 17B:
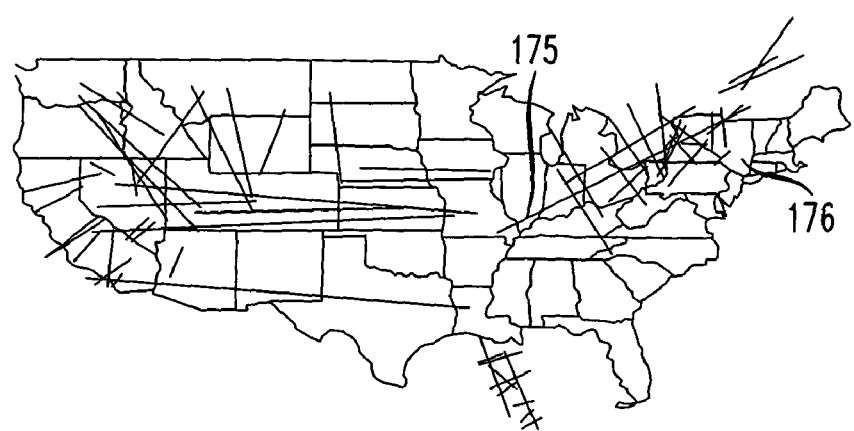

The inventors have found that the best cartograms seem to be obtained when the scanlines are well adapted to the shape of the input polygons and are placed in areas with a high potential for improvement. Automatic placement based on those criteria is difficult to achieve so, in a preferred embodiment of the invention, the user is allowed to interactively position the scanlines depending on the results of the previous steps. The user usually starts with scanlines in regions with a high area error. The scanlines seem to work best if they are positioned such that they are either parallel or orthogonal to the contour of the global polygon. An example a scanline 175 is shown in FIG. 17B.

Once the scanlines are specified for a given polygon mesh, they may be stored and re-applied later to different data on the same map. That makes it practical to generate a continuous time series of cartograms, without user interaction in each step. While the generated cartogram may not be as good as if the scanlines were specified anew, the results seem sufficient for many applications. In the inventors' experience, manual positioning of scanlines is not difficult and can be done quickly. For example, the scanlines shown in FIG. 17B took about 5 minutes to enter. Note that parts of the map such as region 176 that need large changes have many scanlines of varying lengths, while other parts have very few scanlines.

The inventors have implemented the algorithm described above in C using the LEDA library described in Kurt Mehlhorn and Stefan Näher, "The LEDA Platform of Combinatorial and Geometric Computing," Cambridge University Press (1st ed. 1999), http://www.mpi-sb.mpg.de/~mehlhorn/LEDAbook.html. The algorithm was run on a number of different example applications. Unless noted otherwise, the tests were performed on a 1 GHz Pentium computer with 128 Mbytes of main memory. The results of several different approaches are compared below. Although the focus is on efficiency, the examples show that the algorithm of the inventions also provides results of very high quality. For most of the examples, a state map of the continental U.S. serves as a running example.

Figure 18A:
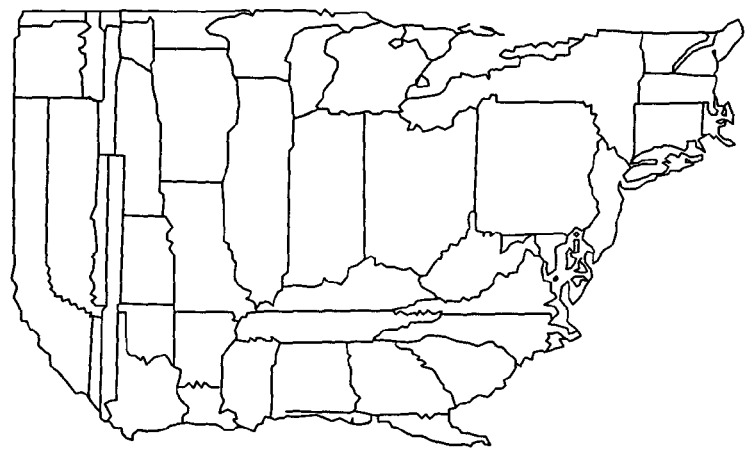
FIGS. 18A, 18B & 18C show cartograms of the United States produced by three different methods.
Figure 18B:
Figure 18C:
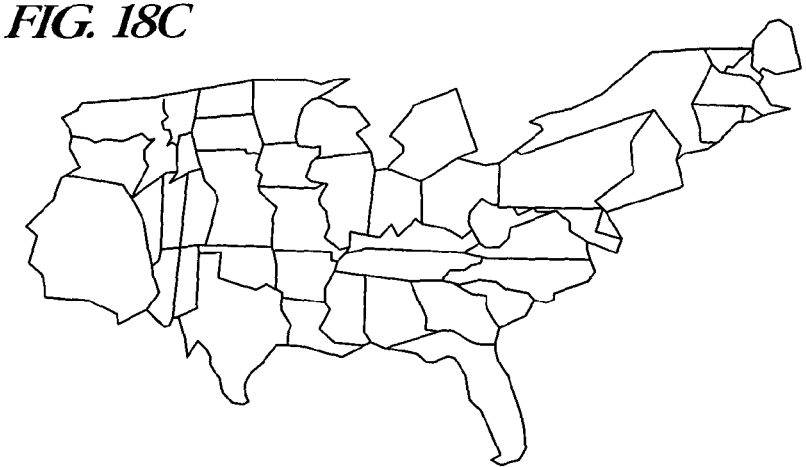

For purposes of comparison, FIG. 18A shows a population cartogram generated by the technique of Tobler (supra), 18B shows a cartogram generated by Kocmoud & House (supra) and 18C show population cartograms generated by the algorithm of the present invention. A visual comparison shows that the presently-described approach offers comparable if not better visual results, with the geography of the United States being clearly perceivable.

Figure 19A:
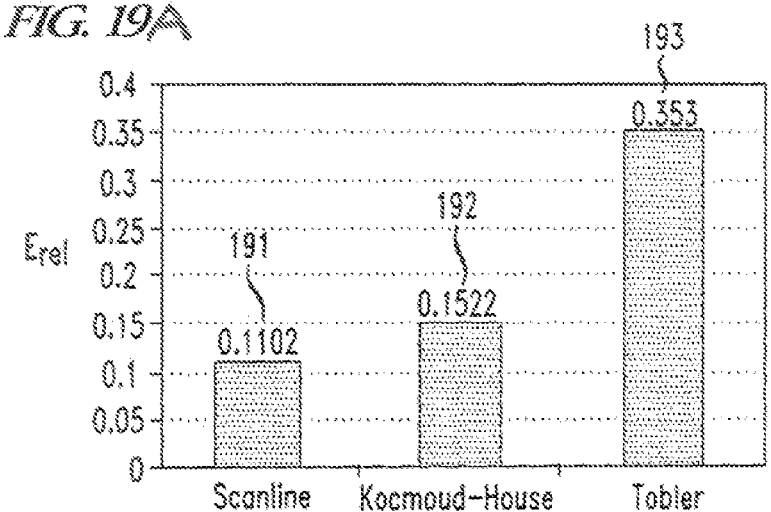
FIGS. 19A, 19B & 19C show plots of data used to evaluate the methods that produced the cartograms of FIG. 18.
Figure 19B:
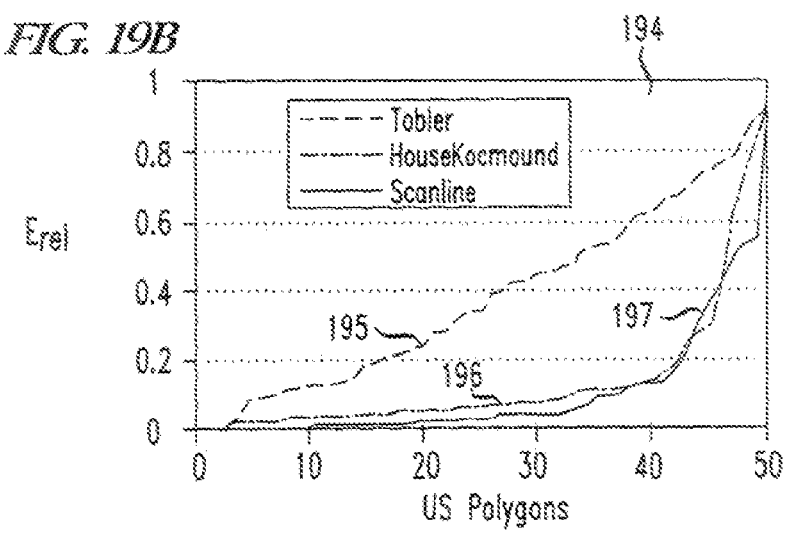

To evaluate the results analytically, a total area error $E_{rel}$ is compared for all three approaches. As can be seen in FIG. 19A, the presently described algorithm 191 provides better results 191 than those of Tobler 193 and even improves upon the results 192 of the complex optimization-based approach of Kocmoud and House. Since the total area error is basically an average over the state-wise area error, the area error is shown state by state in FIG. 19B, sorted according to the area error. The resulting plot 194 reveals that for most states the present approach 197 provides a much better area error than that of the Tobler cartogram 195 and a slightly better area error than that of the Kocmoud & House cartogram 196, with very few exceptions. Note that the Tobler cartogram was not optimized according to the error measure described herein, which puts higher weights on polygons that should become large. Since many of the polygons with large weights still have a large area error in the Tobler cartogram, the overall improvement of $E_{rel}$ by the Tobler cartogram is low.

Figure 19C:
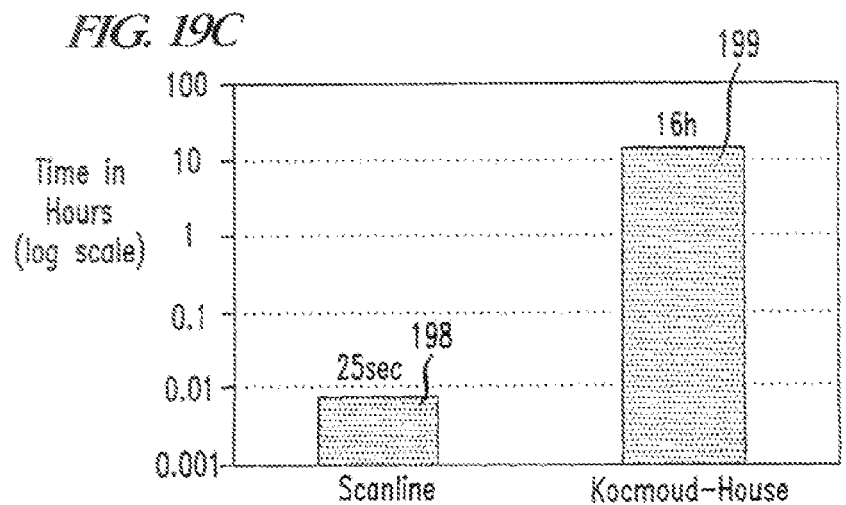

In terms of efficiency, the present approach is faster than existing techniques. While previous approaches need hours or even days to compute a solution, an implementation of the presently described algorithm runs in a matter of seconds. A comparison is shown in FIG. 19C, which assumes that both algorithms run on a 120 MHz computer with 32 MByte RAM. A scanline-based heuristic 198 needs about 25 seconds while the Kocmoud & House approach 199 needs about 16 hours, making the present approach about 2000 times faster.

One important aspect of the cartogram drawing algorithm of the invention is the specification of the scanlines. As mentioned previously, the present algorithm allows scanlines to be determined automatically or interactively. Those two approaches are now compared with respect to effectiveness (quality of the results) and efficiency (time needed to produce the results).

Figure 20A:
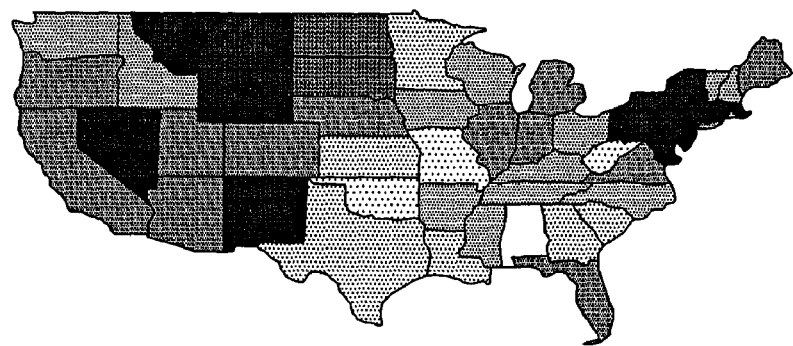
FIG. 20A is a map of the United States showing area error.
Figure 20B:
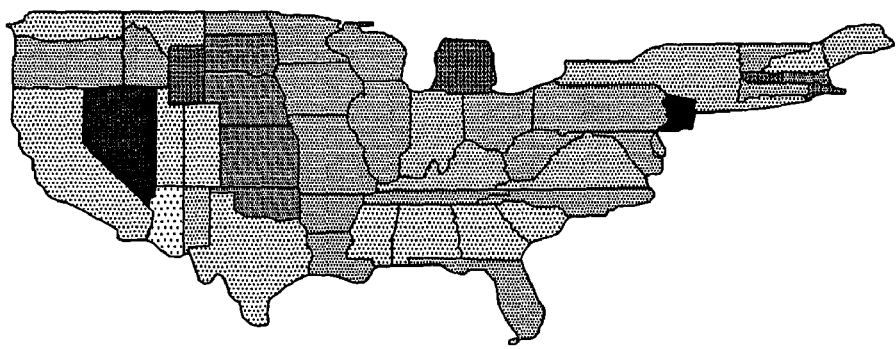
FIGS. 20B & 20C show cartograms produced by the method of the invention showing area error.
Figure 20C:
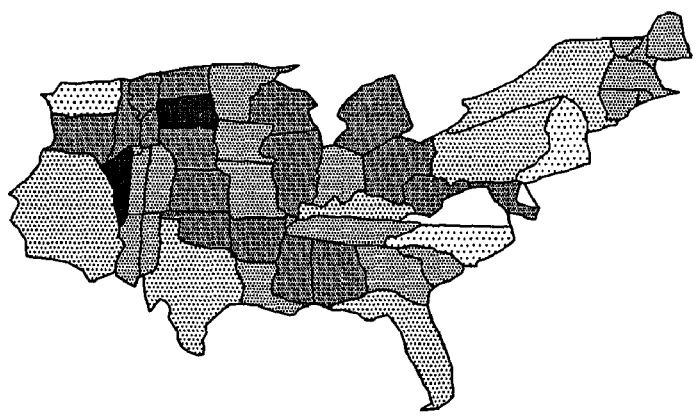
Figure 21A:
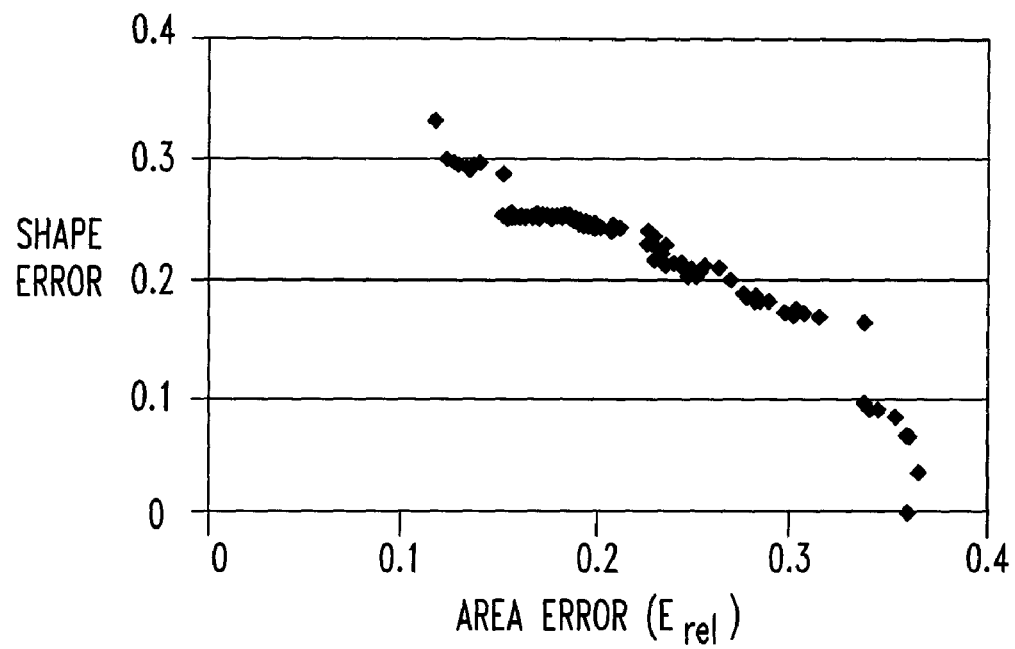
FIGS. 21A & 21B are plots showing shape versus area error for cartograms produced at stages of an algorithm using interactive scanlines.
Figure 21B:
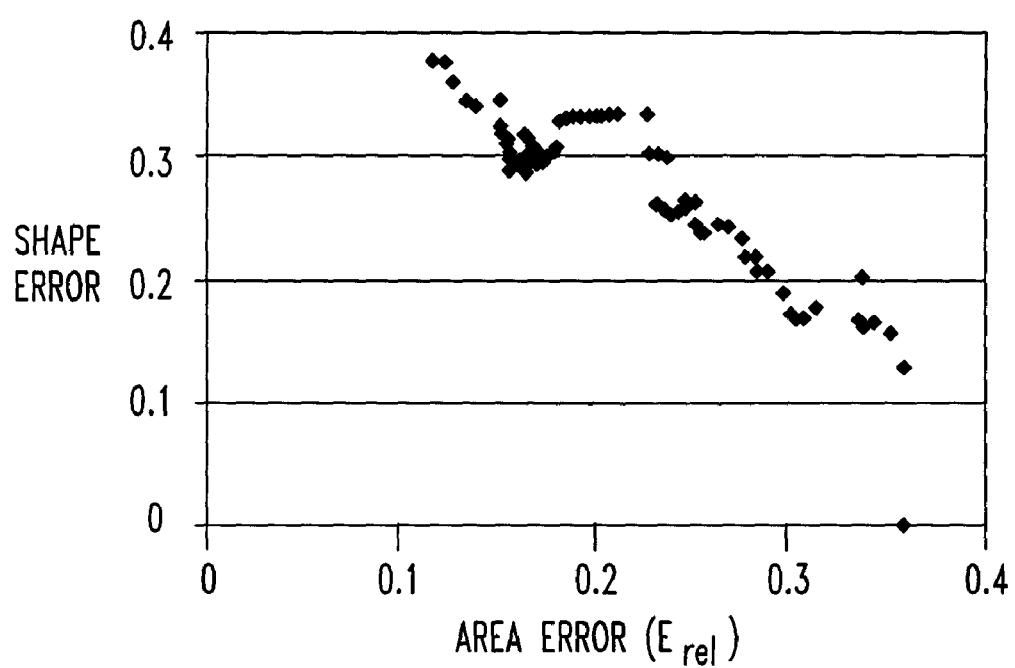

An original US map 200 (FIG. 20A) is distorted in this example using automatically generated scanlines (FIG. 20B) and interactively generated scanlines (FIG. 20C). Both approaches provide high quality cartograms. The area error $E_{rel}$ is 0.36 for the original map; is 0.21 for the cartogram generated with automatically placed scanlines and is 0.10 for the cartogram generated with interactively placed scanlines. Shape distortion, however, appears to be higher for the interactively placed scanlines. To measure shape distortion, the inventors use the Fourier-based shape similarity function described above. The results, shown in FIGS. 21A and 21B, show a tradeoff between area and shape error. Those errors are shown for each incremental step of the algorithm, for the interior state polygons (FIG. 21A) and the global polygon (FIG. 21B). Each point corresponds to one intermediate result of the algorithm (with interactive scanlines). In the beginning, there is a large area error $E_{rel}$=0.36. By applying a scanline, the area error is improved but the shape becomes more distorted. It is therefore natural that the curve goes from the lower right to the upper left until the area error is small enough or the shape distortion reaches some threshold. A similar behavior can be observed for the global shape. There is however a slight difference: while the area error still improves from one step to the next, the distortion global shape in some cases even gets better.

Figure 22:
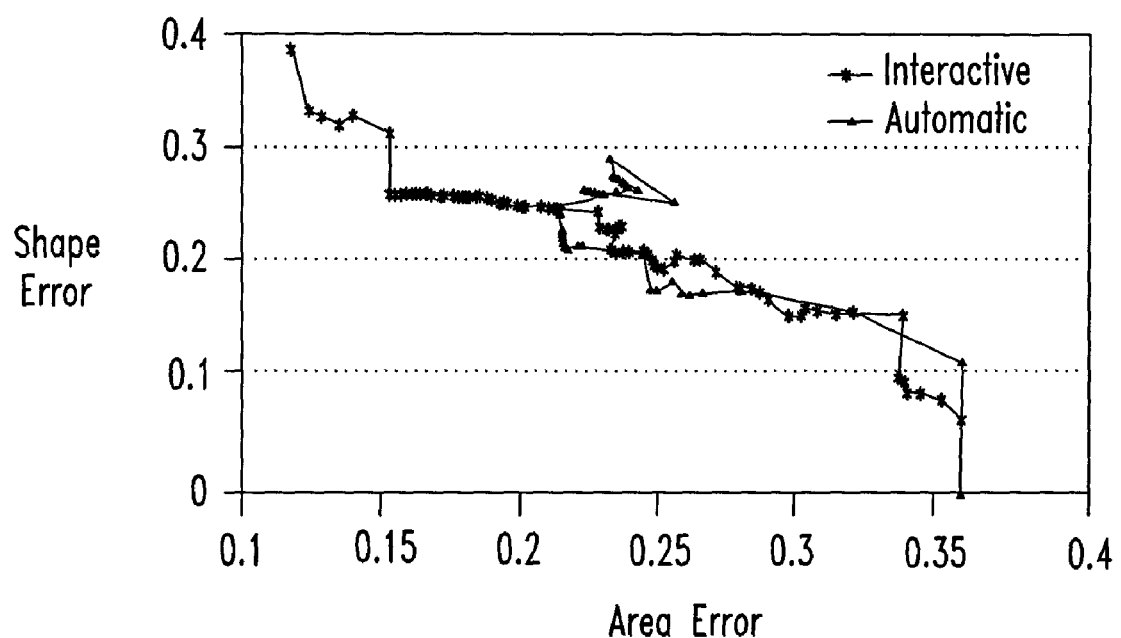
FIG. 22 shows plots of shape versus area error for cartograms produced using interactive and automatic scanlines.

Comparing the area-shape error tradeoff of interactive versus automatic scanlines reveals some interesting properties of the algorithm. As can be seen in FIG. 22, early in the run, both approaches have a similar trend in shape-area error tradeoff. At a certain point, however, the automatically generated scanlines lead to a deterioration in area error that subsequent scanlines are not able to improve. In case of interactively generated scanlines, the area error continues to improve by smaller and smaller increments. Note the jump in shape error for an area error of about $E_{rel}$=0.15. At that point, the direction was switched from scanline to section line as described above, which leads to a continued improvement of the area error but a considerable deterioration of the shape error.

Figure 23A:
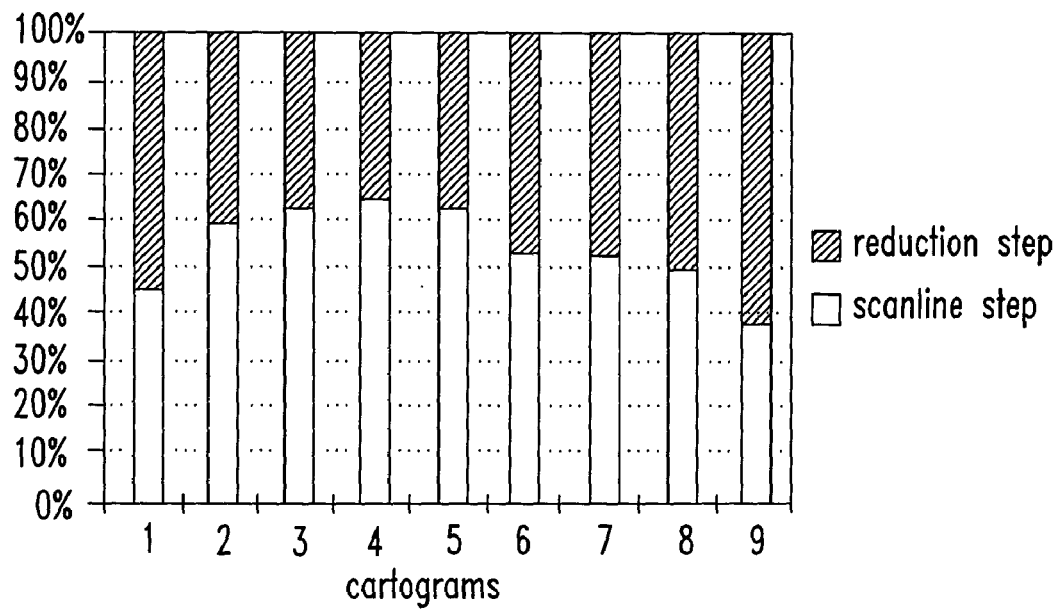
FIGS. 23A, 23B & 23C are plots for evaluating the efficiency of the method of the invention.

The inventors also performed extensive experiments to evaluate the efficiency of the inventive algorithm. The time needed to run the algorithm on the U.S. population data is about 2 seconds. If the parameter vector is changed, the time needed for the reduction step versus the scanline execution varies slightly between 40% and 60%. FIG. 23A shows the percentages needed for the two steps of the algorithm for nine different parameter vectors, namely long-distance telephone call volume data by state for nine time steps during a day. Note that the reduction step can be precomputed so that it does not have to be re-run each time the algorithm is executed.

Figure 23B:
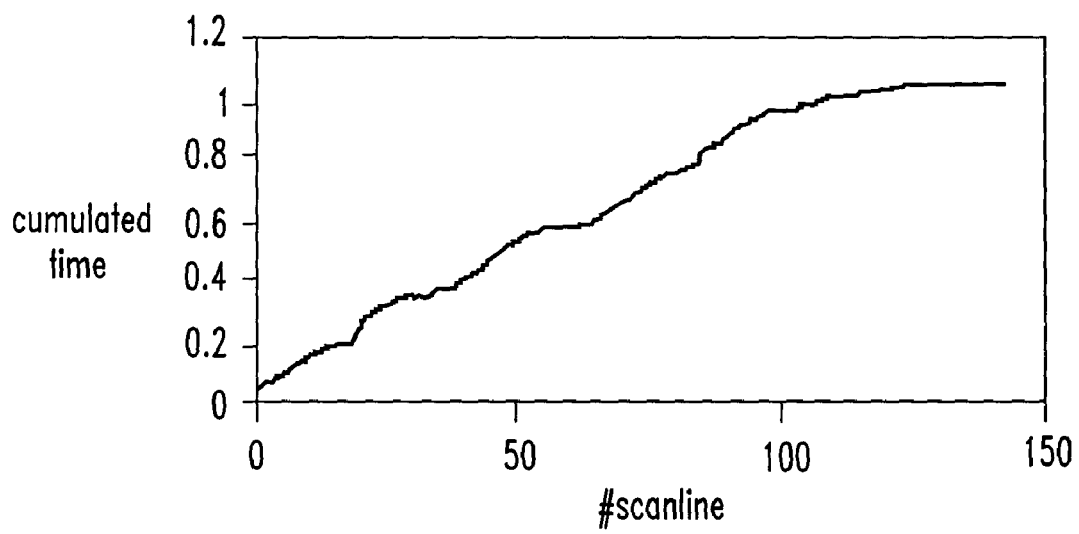

The effect of changing the length of scanlines was also analyzed. FIG. 23B shows the results for the 144 interactively defined scanlines for the US population data. The time needed to process a scanline depends only on the number of scanline sections, which in turn depends only on the length of the scanlines. That means that a steep increase corresponds to long scanlines and a shallow increase corresponds to short scanlines. The figure reveals that shorter scanlines are more likely toward the end of the process and are used for fine tuning some portions of the polygon. Nevertheless, some shorter scanlines are applied regularly in the process as indicated by the irregularities in the curve.

Figure 23C:
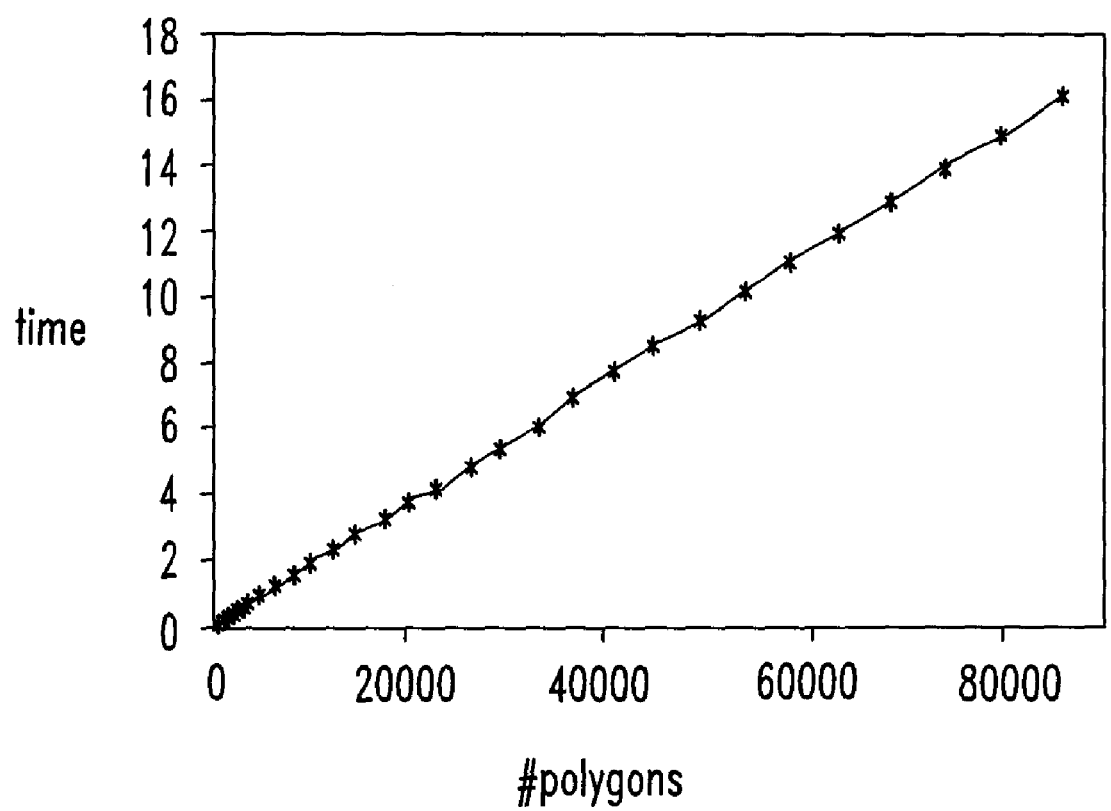

Another efficiency analysis was aimed at testing the dependency of the algorithm on the number of polygons. Since there are not many different real data sets with a widely varying number of polygons, the inventors generated synthetic data sets, namely checker boards with an increasing number of rectangular polygons. Random numbers were then used for initializing the parameter vectors. FIG. 23C shows the results of those tests, revealing a clear linear dependency on the number of polygons. The algorithm requires about 16 seconds for a polygon net consisting of 90,000 polygons. Note, however, that in this case the number of vertices per polygon is very low (four) and a reduction of vertices is not necessary.

Embodiments of the invention include the method set forth above, computer-readable storage media that store instructions for controlling a computing device to perform the steps of the method, and a system or a computing device(s) that generate a cartogram according to the steps of the method or using computing instructions to generate the cartogram. Accordingly, various modules within the computing device may comprise software code that controls the computing device to perform the particular function or functions. Those of skill in the art understand the various software languages and computing devices that may be written and used to carry out the functions of the invention. The computer-readable media may be a compact disc or other movable media storing instructions in the form of a computer program for controlling a computing device.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the measurement of shape error using a Fourier transform of a curvature function is described in combination with a scanline algorithm for vertex placement, that shape error technique may be used with other vertex placement methods while remaining within the scope of the invention. As another example, while the invention is described mostly in terms of generating a cartogram the principles of the invention may be used to generate any visual image from a plurality of continuous polygons having vertices. In other words, the invention is a graphics-related invention and not limited just to cartograms. It is to be understood that the embodiments shown and described herein are only illustrative of the principles of the present invention and that various modifications may be implemented by those skilled in the art without departing from the scope and spirit of the invention.

What is claimed is:

1. A method for generating an image from a plurality of contiguous polygons having vertices, the method comprising:
    calculating via a processor a shape value associated with a polygon by determining a curvature function of the polygon and performing a Fourier transform of the first curvature function to calculate the shape value;
    calculating an altered shape value associated with an altered polygon, the altered polygon being an altered version of the polygon;
    calculating a shape distortion by comparing the shape value and the altered shape value; and
    determining whether to accept the altered polygon based on the calculated shape distortion.

2. The method of claim 1, wherein the image is a cartogram.

3. The method of claim 1, wherein calculating an altered shape value associated with an altered polygon further comprises:
- repositioning one of the vertices of the polygon to produce the altered polygon;
- determining an altered curvature function of the altered polygon; and
- performing a Fourier transform of the altered curvature function to calculate the altered shape value.

4. A system for generating an image from a plurality of contiguous polygons having vertices, the system comprising:
- means including a processor for calculating a shape value associated with a polygon by determining a curvature function of the polygon and performing a Fourier transform of the first curvature function to calculate the shape value;
- means for calculating an altered shape value associated with an altered polygon, the altered polygon being an altered version of the polygon;
- means for calculating a shape distortion by comparing the shape value and the altered shape value; and
- means for determining whether to accept the altered polygon based on the calculated shape distortion.

5. The system of claim 4, wherein the image is a cartogram.

6. The system of claim 4, wherein the means for calculating an altered shape value associated with an altered polygon further comprises:
- means for repositioning one of the vertices of the polygon to produce an altered polygon;
- means for determining an altered curvature function of the altered polygon; and
- means for performing a Fourier transform of the altered curvature function to calculate the altered shape value.

7. A computer-readable storage medium storing instructions for controlling a computing device to generate an image from a plurality of contiguous polygons having vertices, the instructions comprising:
- calculating a shape value associated with a polygon by determining a curvature function of the polygon and performing a Fourier transform of the first curvature function to calculate the shape value;
- calculating an altered shape value associated with an altered polygon, the altered polygon being an altered version of the polygon;
- calculating a shape distortion by comparing the shape value and the altered shape value; and
- determining whether to accept the altered polygon based on the calculated shape distortion.

8. The computer-readable medium of claim 7, wherein the image is a cartogram.

9. The computer-readable medium of claim 7, wherein calculating an altered shape value associated with an altered polygon further comprises:
- repositioning one of the vertices of the polygon to produce an altered polygon;
- determining an altered curvature function of the altered polygon; and
- performing a Fourier transform of the altered curvature function to calculate the altered shape value.

10. A system for generating an image from a plurality of contiguous polygons having vertices, the system comprising:
- a module that control a processor to calculate a shape value associated with a polygon by determining a curvature function of the polygon and performing a Fourier transform of the first curvature function to calculate the shape value;
- a module that calculates an altered shape value associated with an altered polygon, the altered polygon being an altered version of the polygon;
- a module that calculates a shape distortion by comparing the shape value and the altered shape value; and
- a module that determines whether to accept the altered polygon based on the calculated shape distortion.

11. The system of claim 10, wherein the image is a cartogram.

12. The system of claim 10, wherein the module that calculates an altered shape value associated with an altered polygon further repositions one of the vertices of the polygon to produce an altered polygon, determines an altered curvature function of the altered polygon and performs a Fourier transform of the altered curvature function to calculate the altered shape value.

* * * * *